United States Patent
Dao et al.

(10) Patent No.: US 11,659,454 B2
(45) Date of Patent: May 23, 2023

(54) METHODS, SYSTEMS AND APPARATUSES FOR MANAGEMENT OR NETWORK FUNCTIONS

(71) Applicant: HUAWEI TECHNOLOGIES CO., LTD., Shenzhen (CN)

(72) Inventors: Ngoc Dung Dao, Ottawa (CA); Xu Li, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 186 days.

(21) Appl. No.: 17/186,784

(22) Filed: Feb. 26, 2021

(65) Prior Publication Data
US 2021/0274392 A1 Sep. 2, 2021

Related U.S. Application Data

(60) Provisional application No. 62/982,644, filed on Feb. 27, 2020.

(51) Int. Cl.
*H04W 36/00* (2009.01)
*H04W 36/18* (2009.01)

(52) U.S. Cl.
CPC ........ *H04W 36/0033* (2013.01); *H04W 36/18* (2013.01)

(58) Field of Classification Search
CPC ............. H04W 36/0033; H04W 48/18; H04W 36/0011; H04W 8/20; H04W 8/08
See application file for complete search history.

(56) References Cited

U.S. PATENT DOCUMENTS

| | | |
|---|---|---|
| 10,110,495 B1 | 10/2018 | Sabella et al. |
| 2017/0359749 A1 | 12/2017 | Dao |

(Continued)

FOREIGN PATENT DOCUMENTS

| | | | |
|---|---|---|---|
| CN | 109600768 A | 4/2019 | |
| EP | 3737151 A1 * | 11/2020 | ........ H04W 36/0011 |

(Continued)

OTHER PUBLICATIONS

"System Architecture for the 5G System; Stage 2"; 3GPP TS 23.501 V2.0.1 (Dec. 2017).

(Continued)

*Primary Examiner* — Allahyar Kasraian

(57) ABSTRACT

There is provided methods, systems and apparatuses for management of network functions. In some embodiments, an apparatus includes a processor and a non-transient memory for storing instructions that when executed by the processor cause the apparatus to be configured to perform a method including steps as follows. The apparatus is configured to perform steps including sending, towards a source network exposure function (S-NEF) associated with a user equipment (UE), an event notification and obtaining, information on a target network exposure function (T-NEF) to be associated with the UE, and sending towards the S-NEF an event subscription update notification indicative of a change of destination for subsequent event notifications. The apparatus is further configured to perform steps including receiving, from the S-NEF, an event subscription update notification acknowledgement indicative of acceptance of the change and sending, towards the T-NEF, the subsequent event notifications.

20 Claims, 9 Drawing Sheets

(56) References Cited

U.S. PATENT DOCUMENTS

| | | |
|---|---|---|
| 2018/0192472 A1 | 7/2018 | Callard |
| 2018/0227871 A1 | 8/2018 | Singh et al. |
| 2018/0270778 A1 | 9/2018 | Bharatia |
| 2019/0074887 A1 | 3/2019 | Yiu et al. |
| 2019/0261260 A1* | 8/2019 | Dao ........................ H04W 48/18 |
| 2020/0137182 A1* | 4/2020 | Zong ........................ H04W 8/20 |
| 2021/0250838 A1* | 8/2021 | Lu ........................... H04W 36/08 |
| 2022/0210700 A1* | 6/2022 | Wu ......................... H04L 41/0894 |

FOREIGN PATENT DOCUMENTS

| | | |
|---|---|---|
| WO | 2017190640 A1 | 11/2017 |
| WO | 2017197273 A1 | 11/2017 |
| WO | 2017201157 A1 | 11/2017 |
| WO | 2019158121 A1 | 8/2019 |
| WO | 2019216546 A1 | 11/2019 |

OTHER PUBLICATIONS

"Procedures for the 5G System; Stage 2"; 3GPP TS 23.502 V2.0.0 (Dec. 2017).

3GPP TS 23.501 V15.0.0, 3rd Generation Partnership Project; Technical Specification Group Services and System Aspects;System Architecture for the 5G System;Stage 2(Release 15), Dec. 2017. total 181 pages.

3GPP TSG-SA WG2 Meeting #125, S2-180470, Ericsson et al. Application Trigger procedure updates, Gothenburg, Sweden, Jan. 22-26, 2018, total 7 pages.

3GPP TSG-SA WG2 Meeting #125, S2-181357, Ericsson et al. Application Trigger procedure updates, Gothenburg, Sweden, Jan. 22-26, 2018, (Revision of S2-181131 and 0470). Total 7 pages.

3GPP TSG SA WG2 Meeting #122bis, S2-175779, Huawei, HiSilicon:"TS 23.501: AF influenced PDU session establishment and DN authentication/authorization via NEF", Aug. 21-Aug. 25, 2017, Sophia Antipolis, France, (revision of S2-174435), total 6 pages.

3GPP TSG-SA WG2 Meeting #125,S2-180154, Huawei, HiSilicon:"Clarification on Area of Interest for Presence Area Reporting", Gothenburg, Sweden, Jan. 22-Jan. 26, 2018. total 6 pages.

3GPP TS 23.502 V1.3.0 (Nov. 2017), 3rd Generation Partnership Project; Technical Specification Group Services and System Aspects; Procedures for the 5G System; Stage 2 (Release 15), total 215 pages.

3GPP TS 23.503 V16.3.0, 3rd Generation Partnership Project; Technical Specification Group Services and System Aspects; Policy and charging control framework for the 5G System (5GS); Stage 2, (Release 16) (Dec. 22, 2019).

3GPP TS 23.501 V16.3.0 (Dec. 2019), 3rd Generation Partnership Project; Technical Specification Group Services and System Aspects; System architecture for the 5G System (5GS); Stage 2, (Release 16), (Dec. 22, 2019).

3GPP TS 23.502 V16.3.0, 3rd Generation Partnership Project; Technical Specification Group Services and System Aspects; Procedures for the 5G System (5GS); Stage 2 (Release 16), (Dec. 22, 2019).

Ericsson: "Cleanup of Subscribe/Notify usage", 3GPP Draft; S2-176376, XP051335769, Aug. 2017, total 33 pages.

* cited by examiner

METHODS, SYSTEMS AND APPARATUSES FOR MANAGEMENT OR NETWORK FUNCTIONS

CROSS-REFERENCE TO RELATED APPLICATIONS

This application claims priority to U.S. provisional patent application Ser. No. 62/982,644 filed Feb. 27, 2020, the contents of which are incorporated herein by reference.

FIELD

The present disclosure generally pertains to mobile communications using network functions, and in particular to methods, systems and apparatuses for management of network functions.

BACKGROUND

A UE receives services through a protocol data unit (PDU) session, which is a logical connection between the UE and the data network. The UE requests the establishment of the PDU session and as such, in the present context, the UE has an associated UE context and a PDU session context, which has to be stored and managed by the communication network in order to provide the UE with the desired functionality.

The 3rd Generation Partnership Project (3GPP) technical specifications (TS) numbered TS 23.501 version 16.3.0 published in December 2019, TS 23.502 version 16.3.0 published in December 2019, and TS 23.503 version 16.3.0 published in December 2019, for example, represent one approach to the design of a system architecture for next generation mobile networks, also referred to as 5th generation (5G) networks. In proposed "next generation" (NG) networks, such as 5G wireless communication networks, additional flexibility and functionality is available to the network. Moreover, in NG networks, as UEs move to and from locations, there is a desire for techniques to maintain connectivity and enhancing seamless transition, while minimizing latencies and delays. As such, there is a desire to better manage UE context transfers in networks in a manner that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide apparatuses, systems and methods for management of network functions. In accordance with embodiments, a mobile device may be communicatively coupled to a wireless communication network, also referred to as a wireless network, in which the network functions operate. The management of new network functions may enable the reduction of network latency. A technical effect of this embodiment, may be to identify when a network exposure function (NEF) is no longer optimal to support message transfer, thereby improving message transfer.

In accordance with an aspect of the present disclosure, there is provided an apparatus including a processor and a non-transient memory for storing instructions that when executed by the processor cause the apparatus to be configured to perform a method including steps as follows. The apparatus is configured to perform steps including sending, towards a source network exposure function (S-NEF) associated with a user equipment (UE), an event notification and obtaining, information on a target network exposure function (T-NEF) to be associated with the UE, and sending towards the S-NEF an event subscription update notification indicative of a change of destination for subsequent event notifications. The apparatus is further configured to perform steps including receiving, from the S-NEF, an event subscription update notification acknowledgement indicative of acceptance of the change and sending, towards the T-NEF, the subsequent event notifications. A technical effect of this embodiment, may be to identify when a network exposure function (NEF) is no longer optimal to support message transfer, thereby improving message transfer.

In some embodiments, the obtaining step includes performing a selection of the T-NEF for the UE from a set of network exposure functions (NEFs). In some embodiments, the apparatus is configured to perform the method further including the step of discovering the set of NEFs.

In some embodiments, the event subscription update notification includes information on the T-NEF. In some embodiments, the apparatus is configured to perform as one or more of a session management function (SMF), an access and mobility management function (AMF), a unified data management (UDM), or a policy control function (PCF).

In accordance with another aspect of the present disclosure, there is provided an apparatus including a processor and a non-transient memory for storing instructions that when executed by the processor cause the apparatus to be configured to perform a method including steps as follow. The apparatus is configured to perform the steps of receiving an event notification from a network function (NF) and sending the event notification to an application function (AF) and obtaining information on a target network exposure function (T-NEF) to be associated with a user equipment (UE). The apparatus is further configured to perform the steps of sending, towards the T-NEF, an event subscription context transfer request indicative of a request to transfer context information associated with the UE and receiving, from the T-NEF, an event subscription context transfer response indicative of a response to the request. The apparatus is further configured to perform the step of sending, towards the NF, an event subscription update notification acknowledgement indicative of acceptance of the request. A technical effect of this embodiment, may be to identify when a network exposure function (NEF) is no longer optimal to support message transfer, thereby improving message transfer. A further or alternate technical effect of this embodiment may be to reduce signalling load when a NEF is re-selected to transfer the control messages between NFs of a mobile network and the AF.

In some embodiments, the apparatus is further configured to perform the step of receiving, from the NF, an event subscription update notification indicative of a change of destination for subsequent event notifications and sending it to the AF. In some embodiments, the event subscription update notification includes information of the T-NEF. In some embodiments, the apparatus is further configured to perform the step of receiving, from the AF, an event subscription notification acknowledgement indicative of acceptance of the change.

In some embodiments, the information on the T-NEF is obtained from one of the NF and the AF. In some embodiments, the apparatus is configured to perform as a source network exposure function (S-NEF) associated with the UE.

In accordance with another aspect of the present disclosure, there is provided a communication system including a network function (NF), a first network exposure function (NEF) and a second NEF. The NF is configured to send an event notification to the first NEF which is configured to perform as a source NEF (S-NEF) associated with a user equipment (UE) and obtain information on the second NEF which is configured to perform as a target NEF (T-NEF) associated with the UE, and send, to the first NEF, an event subscription update notification indicative of a change of destination for subsequent event notifications. The NF is further configured to receive, from the first NEF, an event subscription update notification acknowledgement indicative of acceptance of the change and send, towards the second NEF, the subsequent event notifications. The first NEF, when performing as the S-NEF associated with the UE, is configured to receive the event notification from a network function (NF) and send it to an application function (AF) and obtaining the information on the second NEF. The first NEF, when performing as the S-NEF associated with the UE, is further configured to send, to the second NEF, an event subscription context transfer request indicative of a request to transfer context information associated with the UE and receive, from the second NEF, an event subscription context transfer response indicative of a response to the request. The first NEF, when performing as the S-NEF associated with the UE, is further configured to send, to the NF, an event subscription update notification acknowledgement indicative of acceptance of the request. A technical effect of this embodiment may be to reduce signalling load when a NEF is re-selected to transfer the control messages between NFs of a mobile network and the AF.

In some embodiments, the second NEF, when performing as the T-NEF associated with the UE, is configured to receive the event subscription context transfer request from the first NEF and send the event subscription context transfer response to the first NEF.

In some embodiments, the second NEF is further configured to perform as a new S-NEF associated with the UE by receiving the subsequent event notifications from the NF and sending them to the AF.

In some embodiments, the NF is further configured to perform a selection of the second NEF for the UE from a discovered set of network exposure functions (NEFs) and send the information on the second NEF to one or more of the first NEF and the AF.

In some embodiments, the AF is configured to perform a selection of the second NEF for the UE from a discovered set of network exposure functions (NEFs) and send the information on the second NEF to one or more of the first NEF and the NF.

In some embodiments, the AF is configured to receive the event notification from the first NEF and the subsequent event notifications from the second NEF.

In some embodiments, the first NEF is further configured to send the event subscription update notification to the AF and receive the event subscription notification acknowledgement from the AF.

In some embodiments, the AF is further configured to subscribe to an event exposure service with the second NEF and unsubscribe to an event subscription service with the first NEF. In some embodiments, the AF is further configured to request to influence traffic routing associated with the UE's traffic via the second NEF and request to cancel influence traffic routing associated with the UE's traffic via the S-NEF.

Embodiments have been described above in conjunctions with aspects of the present invention upon which they may be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

DETAILED DESCRIPTION

Figure 1A:
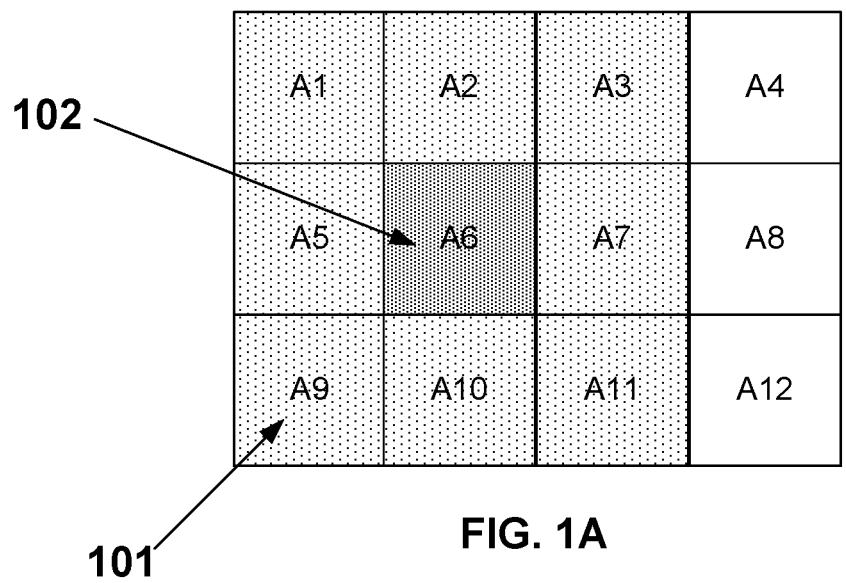
FIG. 1A illustrates an example service area, according to embodiments.

The present disclosure provides apparatuses, systems and methods for management of network functions. In accordance with embodiments, a mobile device may be communicatively coupled to a wireless communication network, also referred to as a wireless network, in which the network functions operate. The management of new network functions may enable the reduction of network latency.

The present disclosure further provides methods and apparatuses for the network functions (NFs) of a wireless network and/or the application function (AF) to identify when a network exposure function (NEF) is no longer optimal to support message transfer. In some embodiments, these methods and apparatuses may reduce the signaling load when a NEF is re-selected to transfer the control messages between NFs of mobile network and the AF. Advantages of the instant application may include the reduction of latency through selection of an NEF in a more suitable service area and/or a reduction of communication signalling with the AF in order to alleviate loading thereon, for example by allowing other network functions to perform NEF selection and reselection, among other advantages of embodiments of the present disclosure.

According to embodiments, solutions to reduce the CP signaling delay are provided. According to embodiments, the AF may be able to select or re-select the network exposure function (NEF) to send or receive control messages from the mobile network. After re-selecting a NEF, the AF may unsubscribe one of more of the event notifications from the current NEF. The current NEF, which may also be termed the source NEF (S-NEF) also to unsubscribe event notifications provided by NFs of the mobile network. The NEF subscribes to receive the event notifications provided by the newly selected NEF, which may also be termed the target NEF (T-NEF). The newly selected NEF also may subscribe again to other NFs of mobile network.

In accordance with embodiments, there is provided a method for reselecting a network exposure function (NEF). The method includes sending and cancelling. The sending step includes, upon discovering a new NEF, which may also be termed the target NEF, sending, by an application function (AF) toward the target NEF (T-NEF), an AF-influence request and subscription message. The discovery of a suitable NEF may be accomplished using a network repository function (NRF), which allows the AF to discover other NEFs within the network. The cancelling step includes cancelling, by the AF, a request and notification subscription with a source NEF (S-NEF), namely the NEF currently being used.

In some embodiments, sending, by the AF toward the T-NEF, the AF-influence request and subscription message may include at least one of subscribing or requesting. The subscribing step may include subscribing, by the AF toward the T-NEF, to an event exposure service. The requesting step may include requesting, by the AF toward the T-NEF, to influence traffic routing. The subscribing step and the requesting step may involve communications with a variety of network entities which may include a control plane NF (CP NF), the S-NEF, the T-NEF, the NRF and the AF.

In some embodiments, cancelling, by the AF, the request and notification subscription with the S-NEF may include at least one of unsubscribing or cancelling. The unsubscribing step may include unsubscribing, by the AF, from an event exposure service with the S-NEF. The cancelling step may include cancelling, by the AF, influence traffic routing with the S-NEF. The unsubscribing step and the cancelling step may involve communications with a variety of network entities which may include a control plane NF (CP NF), the S-NEF, the T-NEF, the NRF and the AF.

In accordance with embodiments, there is provided a method for reselecting a network exposure function (NEF). The method includes various steps of sending and receiving messages among NFs. The method includes sending, by a NF towards an S-NEF, an event notification. The method includes, upon selection of T-NEF, sending, by the NF towards the S-NEF, an event subscription update notification. Selection of a T-NEF may involve at least one NF and the S-NEF. The method includes receiving, by the NF from the S-NEF, an event subscription update notification acknowledgement. At a fourth step, the method includes sending, by the NF towards the T-NEF, event notifications.

In some embodiments, the NF may include at least one of a session management function (SMF), an access and mobility management function (AMF), a unified data management (UDM), or a policy control function (PCF).

In accordance with embodiments, a method is provided for reselecting a network exposure function (NEF). The method includes various steps of sending and receiving messages among NFs. A first step of the method includes receiving, by an S-NEF from a NF, an event notification. The method includes sending, by the S-NEF towards an AF, an event notification. The method includes, upon selection of a T-NEF, receiving, by the S-NEF from the NF, an event subscription update notification. Selection of a T-NEF may involve at least one NF and the S-NEF. The method includes sending, by the S-NEF towards the AF, an event subscription update notification. The method includes receiving, by the S-NEF from the AF, an event subscription notification acknowledgement. The method includes sending, by the S-NEF towards the T-NEF, an event subscription context transfer request. The method includes receiving, by the S-NEF from the T-NEF, an event subscription context transfer response. The method includes sending, by the S-NEF towards the NF, an event subscription update notification acknowledgement.

In accordance with embodiments, a method is provided for reselecting a NEF. The method includes sending and receiving. The method includes receiving, by an AF from an S-NEF, an event notification. The method includes, upon determination of a T-NEF, sending, by the AF towards the S-NEF, an event subscription modification request. Determination of a T-NEF may be performed by the AF. The method includes receiving, by the AF from the S-NEF, an event subscription modification response. The method includes receiving, by the AF from the T-NEF, an event notification.

In accordance with embodiments, a method is provided for reselecting a NEF. The method includes sending and receiving messages among NFs. The method includes sending, by an intermediate session management function (I-SMF) towards an SMF, an event notification. A second step of the method includes sending, by the I-SMF towards an S-NEF, an event notification. The method includes, upon determination of a T-NEF, sending, by the I-SMF towards the S-NEF, an event subscription update notification. Determination of a T-NEF may involve one or more of the I-SMF, the SMF and the S-NEF. The method includes receiving, by the I-SMF from the S-NEF, an event subscription update notification acknowledgement. The method includes sending, by the I-SMF towards the T-NEF, an event notification.

In accordance with embodiments, a method is provided for reselecting a NEF. The method includes sending and receiving messages among NFs. A first step of the method includes receiving, by an AF from an S-NEF, an event notification. The method includes, upon determination of a target NEF (T-NEF), sending, by the AF towards the S-NEF, an event subscription modification request. Determination of a T-NEF may be performed by the AF. The method includes receiving, by the AF from the S-NEF, an event subscription modification response. The method includes receiving, by the AF from the T-NEF, an event notification.

In accordance with embodiments, an aspect of the present disclosure relates to a service area of network functions. One or more network functions may be configured as a NF set, a NF instance of a NF set, a NF service set of a NF instance, or a NF service instance of a NF service which may provide service to UEs or other NFs in one service area. The service area may be divided into two sub-service areas: a core service area (CSA); and an extended service area (ESA).

While the discussion herein may be directed towards wireless communication, it is to be understood that this wireless communication can take a variety of forms. For example, embodiments of the present disclosure can be directed towards satellite communications, Internet of Things (IoT) communications, Internet of Vehicle (IoV) communications or other suitable wireless communication configuration as would be readily understood. As such, a UE or a network function (e.g. S-NEF, T-NEF, AF SMF, AMF, PCF, UDM, UDR) can take the form of a satellite or a vehicle or IoT device or other wireless communication device capable of performing the necessary functions or actions, as would be readily understood that.

Figure 1B:
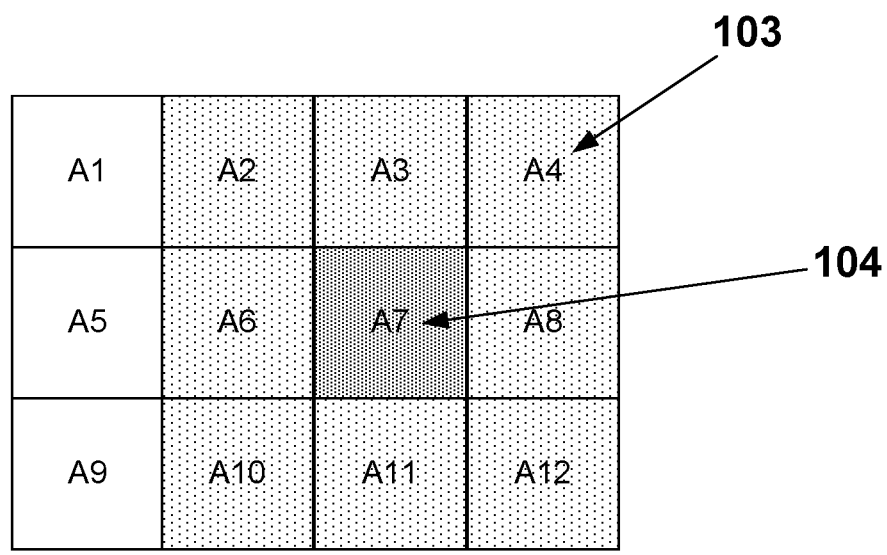
FIG. 1B illustrates another example service area, according to embodiments.

Examples of service areas is illustrated in FIG. 1A and FIG. 1B. The assigned service area of a NF-1, depicted in FIG. 1A, includes the core service area 102 A6 and extended service areas 101 including areas A1, A2, A3, A5, A7, A9, A10 and A11. The assigned service area of another NF-2, depicted in FIG. 1B, includes the core service area 104 A7 and extended service areas 103 including areas A2, A3, A4, A6, A8, A10, A11 and A12. The core service areas of NF-1 and NF-2 are non-overlapping. The extended service areas of NF-1 and NF-2 are overlapping as they contain common service areas A2, A3, A10 and A11.

The assigned service area of a NF set, or a NF instance, or a NF service set, or a NF service instance may or may not overlap with the service area of another NF set, or another NF instance, or another NF service, or another NF service instance. The core service areas of two NF sets, or two NF instances, or two NF service sets, or two NF service instances may not overlap. The extended service areas of two NF sets, or two NF instances, or two NF service sets, or two NF service instances may or may not overlap. The core service area of a NF set, or a NF instance, or a NF service set, or a NF service instance may or may not overlap with the extended service area of another NF set, or another NF instance, or another NF service, or another NF service instance.

The assigned service area of a NF may be represented by one or more combinations of information which may include: (1) one or more (or a list of) identifiers, such as new radio (NR) cell identity (NCI) or NF cell global identity (NCGI), or cell ID, or evolved universal terrestrial radio access network (E-UTRAN) cell identity (ECI), or E-UTRAN cell global identification (ECGI), or radio access network (RAN) ID, to identify a base transceiver station or a group of base transceiver stations, of a public land mobile network (PLMN); (2) identification of one or more geographical zones; wherein a geographical zone may be represented by geographical zone ID; (3) one or more identifiers of tracking area, such as tracking area identity (TAI); (4) one or more (or a list) of NF instance identifiers, NF set identifiers, NF service instance identifiers, or NF service set identifiers, where the NF could be any network function such as SMF, AMF, PCF, AF, UDM, UDR; (5) one or more (or a list) of data network access identifiers (DNAI).

The assigned service area, including the core service area and the extended service area, of a NF, such as SMF, NEF, AMF, may be stored in the NF profile of this NF.

When a NF (for example a NF service consumer) wants to discover other NFs (for example one or more NF service producers) by using a network repository function (NRF) or service communication proxy (SCP), the NF service consumer may provide the service area, and/or core service area, and/or extended service area to the NRF, or SCP in the NF discovery request message. The NRF or SCP may use the provided information, including service area, and/or core service area, and/or extended service area to identify one or more NF Sets, or NF instances, or NF service sets, or NF service instances that may represent other NFs. The NRF or SCP may send a response to the NF (for example the NF service consumer) including one or more NF profiles of NF sets, or NF instances, or NF service sets, or NF service instances that may provide service in the service area, and/or core service area, and/or extended service area.

The NF service consumer, for example an AMF, SMF, PCF or another network function, may select a NF service producer, such as an SMF, AMF, PCF or another network function, at least in part based on one or more of the following factors: (1) service area, and/or core service area, and/or extended service area of the NF service consumer; (2) service area, and/or core service area, and/or extended service area of the NF service producer; (3) data network name(s) (DNN); (4) location of the application server(s) (AS) that may be represented by the data network access identifier (DNAI), Internet protocol (IP) address(es) of the AS, IP prefix(es) of the AS, fully qualified domain name (FQDN) of the AS; (5) UE mobility information; (6) UE communication pattern; (7) UE location among others as would be readily understood by a worker skilled in the art.

The UE mobility information may include one or more of: UE mobility pattern provided by the AF that communicates with an application in the UE and the UE mobility analytics (for example UE mobility statistics or UE mobility prediction) provided by a network analytics function (e.g. network data analytics function (NWDAF)). The NF service consumer may use the UE mobility information to select or re-select a NF service producer in order to avoid frequent selection or re-selection of a NF service producer, and to optimize other requirements such as control information and/or packet transfer between the UE and application server, and between the control plane (CP) NFs and external entities (e.g. AF) supporting the data session between the UE and application server(s).

When the UE location is within a core service area of a NF set, or a NF instance, or NF service set, or a NF service instance, this NF, or the NF instance, or the NF service instance may be selected with higher priority, compared to other NFs. The NF may serve UE better when the UE is within the core service area of this NF; for example the packet delay for transmitting data or signaling messages between the NF and the UE may be shorter. If there are more than one NFs, or more than one NF instances, or more than one NF service sets, or more than one NF service instances having core service areas covering the UE location, the NF service consumer (such as AMF) may select a NF set, or a NF instance, or NF service set, or NF service instance based on the UE mobility pattern, UE communication pattern, current NF load, NF load analytics (such as statistics or prediction of the NF load) and other factors as would be readily understood. When a UE location is in the core service area of a NF such as an S-NEF, this NF may be selected to serve the UE. When the UE location is in the extended service area of the NF, the UE may be served by this NF. Alternatively, another NF (for example a T-NEF) may be selected to serve the UE. By using the core service area and extended service area, the discovery and selection of NFs to serve a UE thus may be made flexible. The procedures to discover or select or re-select one or more NFs to serve a UE may be performed at different times. For example the selection of an SMF may be made at the same time during the handover process, in which the UE serving cell (or radio node) changes. In another example, the selection of an SMF may be made at the same time during the handover process or at a different time after the handover process finishes. In this scenario, the serving cell (or radio node) is in an overlapping service area of two SMF instances (or two SMF sets, or two SMF service instances). The re-selection of a new SMF may happen after the UE handover procedure, thus the SMF re-selection procedure does not cause additional signaling load to the UE handover procedure.

Figure 2:
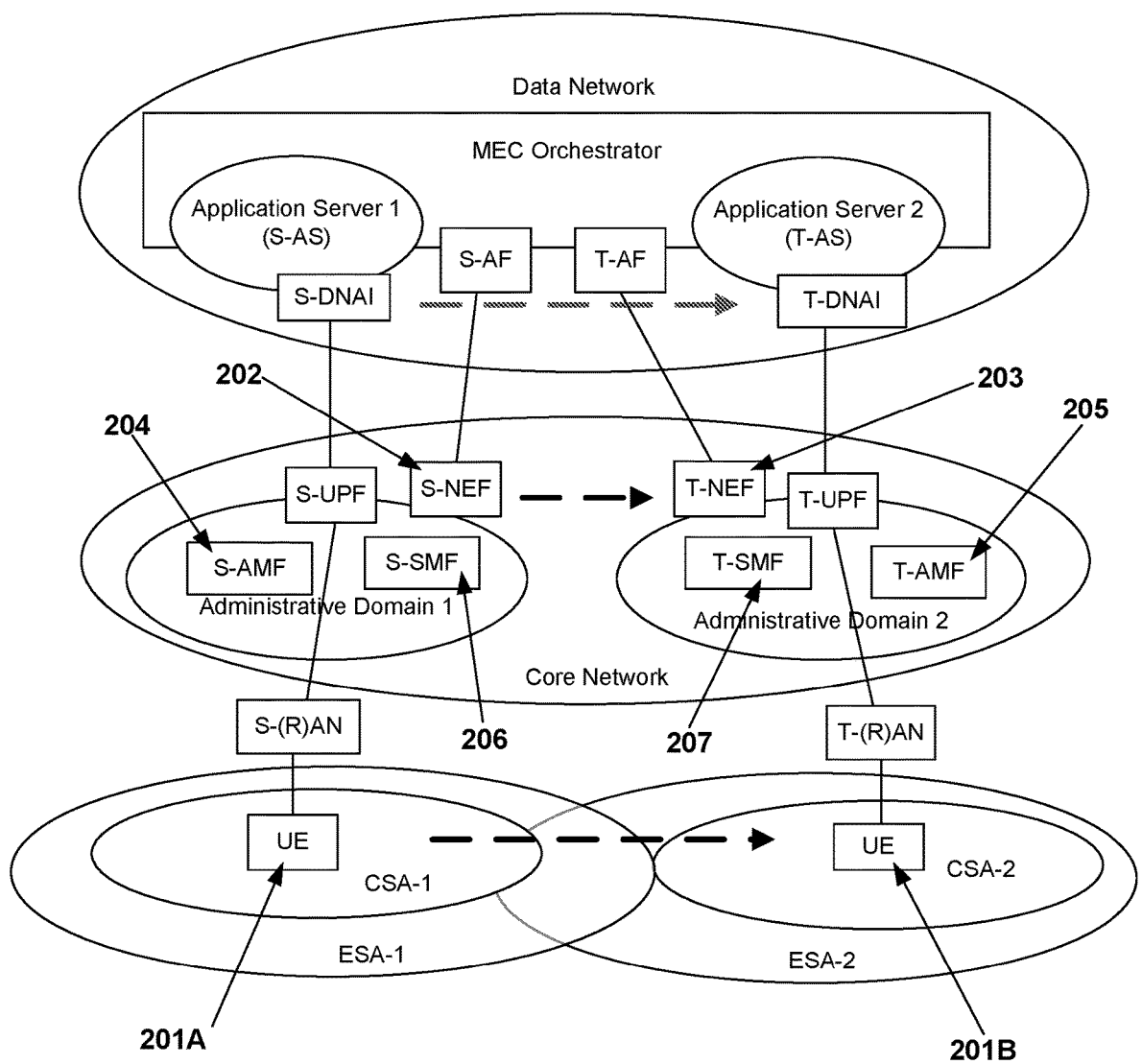
FIG. 2 illustrates the example service areas of network functions, according to embodiments.

Another example is shown in FIG. 2. An AMF (source AMF, or S-AMF 204) may select an SMF (source SMF or S-SMF 206) to serve a protocol data unit (PDU) session of a UE 201A if the UE location is within the core service area of the S-SMF 206. If the same UE moves to another location 201B within the extended service area of the S-SMF 206, it is possible that: the S-AMF 204 (or target AMF or T-AMF 205) may select another SMF, e.g. target SMF (T-SMF 207), to serve the UE 201B as this UE is moving to this new location; or the S-SMF 206 may transfer the UE context or PDU session context to a T-SMF 207 that could serve the UE. The UE location may be within the core service area or extended service area of the new T-SMF 207. The service area of the T-NEF can include an extended service area that at least partially overlaps with the extended service are or the core service area of the S-NEF. The UE related information, for example the UE context or PDU session context, can be transferred from the S-NEF to the T-NEF when the UE is within an overlapped service area between the extended service are of the S-NEF and the service area of the T-NEF, namely the extended service area or the core service area of the T-NEF. In some embodiments, the reselection of an NEF can provide aid with the mitigation of communication network latency, for example transferring from a S-NEF to a T-NEF.

FIG. 2 illustrates an example service area of two SMFs. The service area of the S-SMF 206 includes the core service area 1 (CSA-1) and extended service area 1 (ESA-1), the service area of the T-SMF 207 includes CAS-2 and ESA-2. A technical benefit or advantage of this embodiment is group context creation in control plane (CP) functions.

According to embodiments, the NEF re-selection may be triggered by an AF. According to embodiments, there is provided a method for the AF to select or re-select a NEF instance or NEF service instance.

Figure 3:
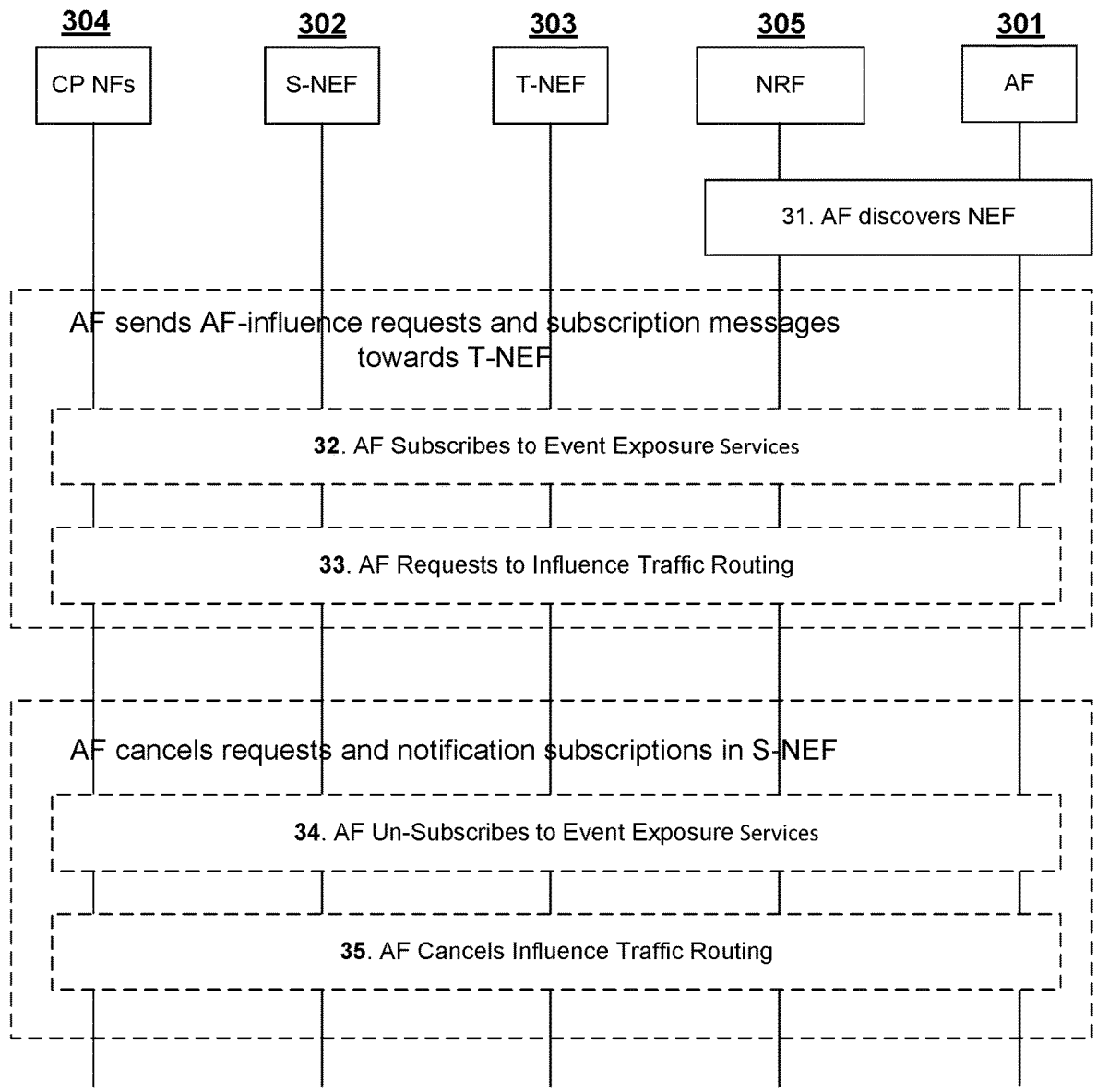
FIG. 3 illustrates a method for using an application function (AF) to select or reselect a network exposure function (NEF) instance or NEF service instance, according to embodiments.

Referring to FIG. 3, a method is presented to illustrate how an AF re-selects a NEF according to embodiments. At Step 31 of FIG. 3, the AF 301 may be aware of UE location and/or UE mobility information. For example, the mobile network may send UE information, such as the UE location and/or the UE mobility information, to the AF 301. Alternatively, the UE may send a message to the AF 301 regarding UE information that may include the UE location. The UE location could be represented by one or more of the following location information: (1) the identify of a mobile network entity, such as the identity of a RAN node, a cell (e.g. cell ID, NCI, RAN ID), UPF ID); (2) tracking area identity (TAI); (3) a geographic zone ID; (4) an estimated geographical location (for example 2-dimensional or 3-dimensional); (5) a service area ID of a mobile network function, such as service area ID of SMF, or service area ID of AMF; (6) the IP address(es) or IP prefix(es) of UE; (7) global positioning system (GPS) location of UE, for example 2-dimensional or 3-dimensional, reported by the UE.

The UE mobility information, such as UE mobility analytics, which may include UE mobility statistics or UE mobility prediction in one or multiple time windows may be provided by the NWDAF. The AF may subscribe to the mobile network to receive the UE mobility information.

The AF 301 may send a request to NRF 305 or a common application programming interface framework (CAPIF) function to discover NEF instance(s) or NEF service instance(s). The AF 301 may discover an available NEF by using a Nnrf_NFDiscovery_Request service of the NRF. The message may include the UE location information, UE mobility information, DNAI, network slice information (for example single network slice selection assistance information (S-NSSAI), network slice instance identifier (NSI-ID)), application information (e.g. application ID, AF-service-ID, AF ID), AS information (for example DNAI(s), IP address(es) of the AS, IP prefix(es) of the AS, FQDN(s) of the AS).

The NRF 305 or CAPIF may send a response message to the AF 301. The response may include one or more NF profiles of NEFs that match the information provided the AF 301. The NEF profiles may include the service area, and/or core service area, and/or extended service area of the respective NEF.

From the NEF profiles provided by the NRF 305 or CAPIF, the AF 301 selects a NEF instance or NEF service instance.

At Step 32 of FIG. 3, the AF 301 may subscribe to event exposure services of mobile network. The AF 301 may send the subscribe messages to the newly selected T-NEF 303.

The T-NEF 303 may send subscription messages to one or more corresponding NFs that may provide the event notifications requested by the AF 301. The T-NEF 303 may set the notification target address to the address of the T-NEF 303 so that the NF that produces the event notifications could send the event notifications to the T-NEF 303.

At Step 33 of FIG. 3, the AF 301 may send request to influence traffic routing to the mobile network via the newly selected T-NEF 303.

At Step 34 of FIG. 3, the AF 301 may cancel previous subscriptions that were sent from the S-NEF 302.

At Step 35 of FIG. 3, the AF 301 may cancel request to influence traffic routing that were sent to the S-NEF 302.

In some embodiments, at Step 32 of FIG. 3, the AF 301 may use a service of the T-NEF 303, e.g. Nnef_EventExposure_Subscribe, to subscribe for event notifications. The T-NEF 303 may subscribe to event notifications of mobile network functions, such as AMF, SMF, UDM, PCF, to receive the event notifications to which to the AF 301 is subscribed.

In some embodiments, at Step 34 of FIG. 3, the AF 301 may use a service of the S-NEF 302, e.g. Nnef_EventExposure_Unsubscribe, to cancel one or more subscriptions for event notifications that the AF no longer receives from the S-NEF 302, since the AF 301 has subscribed to receive these event notifications from the T-NEF 303 in Step 32 of FIG. 3.

In some embodiments, the NEF re-selection may be triggered by NFs of the mobile network, in that one NF (such as an SMF, AMF, UDM, PCF, NEF) that provides event notifications to one or more of the NEF and AF, may check whether the UE location is: (1) within the core service area of the SMF; and/or (2) within the core service area of the NEF. In some embodiments, if one or more of these conditions are not met, the NF may trigger a NEF re-selection procedure.

Figure 4:
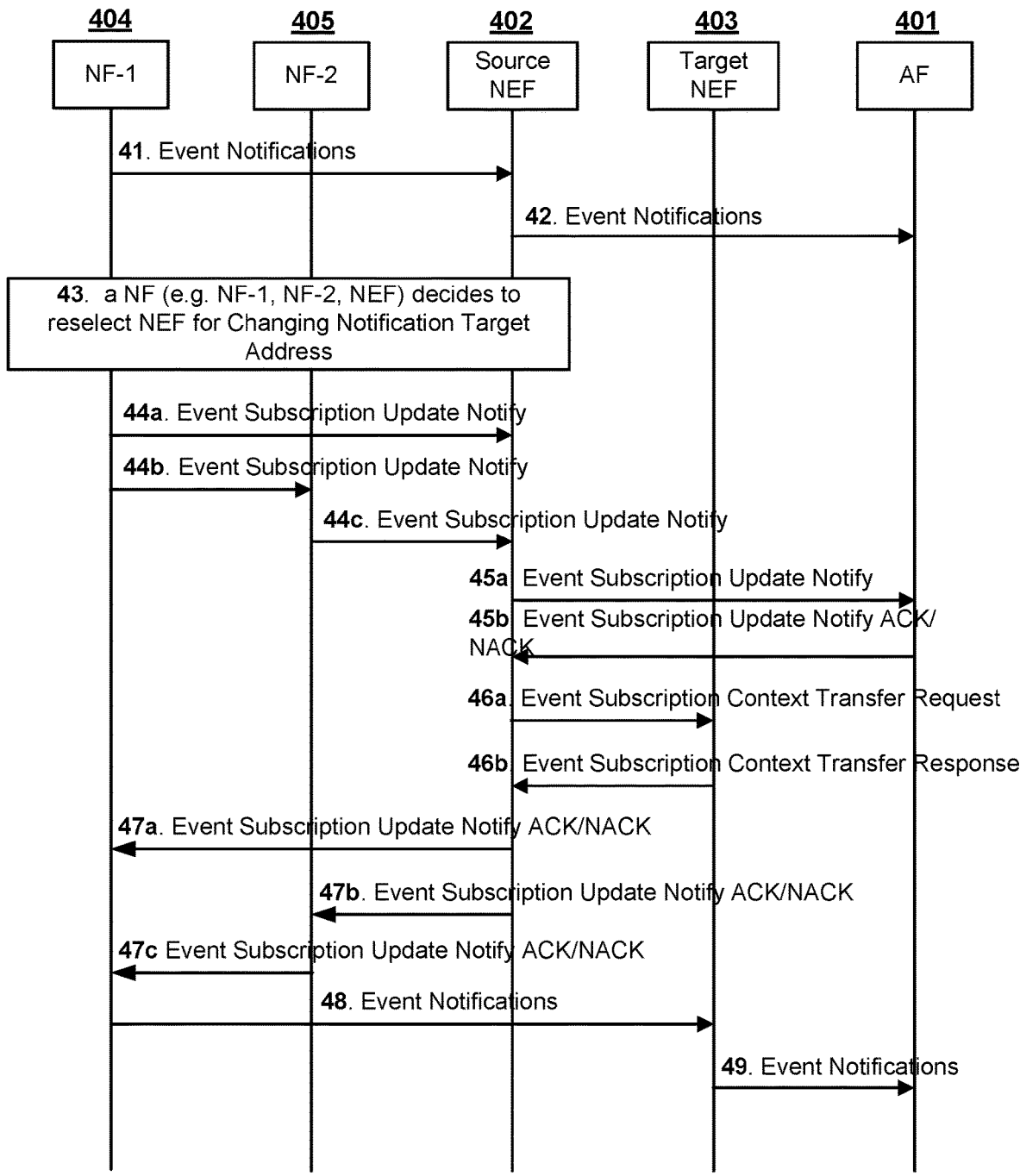
FIG. 4 illustrates a method for transferring an event subscription context stored in a source NEF to a target NEF, according to embodiments.

Referring now to FIG. 4, this figure illustrates a method to allow transferring an event subscription context stored in a source NEF to a target NEF according to embodiments. These embodiments can provide a means for reduction of communication with an AF during reselection of a NEF, for example transferring from a S-NEF to a T-NEF.

At Step 41 of FIG. 4, a NF-1 404, which may be an SMF, AMF, UDM, PCF or other network function, sends event notifications to a source NEF (S-NEF) 402.

The event notifications could be sent from NF-1 404 by using an event exposure service of NF-1, for example: Namf_EventExposure_Notify service of the AMF when NF-1 is an AMF; Nudm_EventExposure_Notify service of the UDM when NF-1 is a UDM; Nsmf_EventExposure_Notify service of the SMF when NF-1 is a SMF; Npcf_EventExposure_Notify service of the PCF when NF-1 is a PCF; or Nnwdaf AnalyticsSubscription_Notify service of the NWDAF when NF-1 is a NWDAF.

According to embodiments when NF-1 404 is a NWDAF, the NWDAF may provide UE mobility analytics to the NFs, such as S-NEF 402, or AF 401, that have subscribed to receive these UE mobility analytics.

At Step 42 of FIG. 4, the source NEF (S-NEF) 402 forwards the received event notifications to the AF 401.

The S-NEF 402 may use a service of the NEF, e.g. Nnef_EventExposure_Notify service, to send the event notifications to the subscribed AF 401, or other NFs.

At Step 43 of FIG. 4, the NF-1 404 or the S-NEF 402, may decide to re-select another NEF (e.g. target NEF (T-NEF) 403) to send event notifications. A trigger that causes this NEF to determine if reselection is necessary may be one or more of the following factors. In some embodiments, a further network function, NF-2 405 is present in the network configuration and in this instance, NF-2 may or may not be involved in the decision relating to reselection of the NEF.

A first factor to determine if reselection is necessary may relate to load balancing. For example, it may be identified that the load of S-NEF is higher than a threshold, which may cause errors or longer delay in the message processing of the S-NEF. Another reason is that it may be determined that the load of the S-NEF 402 is higher that the load of the T-NEF 403. If the NF-1 404 and/or NF-2 405 register to receive status updates of the S-NEF 402 from the NRF, the NRF may send the load information of the S-NEF 402 or availability information of the S-NEF 402 to the NF-1 404 and/or NF-2 404

A second factor to determine if reselection is necessary may relate to a denial of service (DoS) attack. For example, the S-NEF 402 may be attacked by malicious external entities or experiencing high load. The S-NEF 402 may be requested by the OAM (operation, administration, and maintenance) system to transfer some or all event subscriptions to the T-NEF 403. The OAM may send an instruction to the S-NEF 402, the instruction may include the address of the T-NEF 403 (such as IP address, end point address, T-NEF ID, FQDN of the T-NEF).

A third factor to determine if reselection is necessary may relate to reducing message transfer delay. For example, the NF-1 404, or NF-2 405, or S-NEF 402 may know the current UE location. If the UE location is outside of service area, or outside the core service area of the S-NEF 402, the NF-1 404 or NF-2 405, or S-NEF 402 may decide to perform a reselection to select T-NEF 403 to send event notifications to. The NF-1, or NF-2, or S-NEF may use information relating to one or more of the UE mobility information and packet delay requirements to determine if reselection is necessary.

At Step 44a of FIG. 4, if the S-NEF 402 directly subscribes to the NF-1 404 for event notifications of one or more event identifiers (IDs), the NF-1 404 may send an event subscription update notify (or notification) message to the S-NEF 402. An event subscription update notify or notification can be indicative of a change of destination for subsequent event notifications. For example the destination can be considered to be a UE, or application function (AF) or a network function that is configured to receive the event notifications. The message may include the information relating to T-NEF 403, for example information relating to one or more of the network function profile of the T-NEF, the address of the T-NEF (for example IP address(es), FQDN, endpoint address). The NF-1 404 may use a service of NF-1 or a service of NF-2 405 to send the event subscription update notify (or notification) message to the S-NEF 402. As would be readily understood, in some network configurations, NF-2 405 may not be present and as such in these instances Steps 4b and 4c of FIG. 4 may be skipped as they may be considered irrelevant.

In embodiments wherein NF-2 405 is present in the network configuration, at Step 44b of FIG. 4, if the S-NEF 402 indirectly subscribes to the NF-1 404 via NF-2 405 for event notifications of one or more event IDs, the NF-1 404 may send an event subscription update notify (or notification) message to the NF-2 405. The message may include the information of T-NEF 402, for example one or more of the network function profile of the T-NEF and address of the T-NEF (e.g. IP address(es), FQDN, endpoint address). The NF-1 may use a service of NF-1 404 or a service of NF-2 405 to send the event subscription update notify (or notification) message to the S-NEF 402.

In an embodiments, wherein NF-2 is present in the network configuration, at Step 44c of FIG. 4, if the S-NEF 402 indirectly subscribed to the NF-2 for event notifications of one or more event IDs provided by NF-1, and the NF-2 405 received from NF-1 404 the event subscription update notify (or notification) message, the NF-2 405 may send an event subscription update notify (or notification) message to the S-NEF 402. The message may contain the information of T-NEF 403 received from the message sent by the NF-1 404 in Step 44b of FIG. 4. The NF-1 404 may use a service of NF-1 or a service of NF-2 to send the event subscription update notify (or notification) message to the NF-2; and then the NF-2 may use a service of NF-2 or a service of the S-NEF 402 to send the event subscription update notify (or notification) message to the S-NEF 402. The information of the T-NEF 403 sent in step 44b and 44c may be the same as the information sent in the message of step 4a.

At Step 45a of FIG. 4, after receiving the Event Subscription Update Notify from the NF-1 or NF-2, the S-NEF may send to the AF an Event Subscription Update Notify message. The message may include an indication to update the existing subscription of the AF and an indication to update the information of NEF, which is the T-NEF that will send the event notifications to the AF, and the information of the AF. The information of the T-NEF may be one or more information the S-NEF received from the NF-1 or NF-2, e.g. the NF provide of the T-NEF, the address of the T-NEF (e.g. IP address(es), IP prefix(es), FQDN, endpoint address), NF ID of the T-NEF.

At Step 45b of FIG. 4, the AF 401 may decide whether to use the new T-NEF 403 or not.

If the AF 401 decides to use the new T-NEF 403, the AF may store the information of T-NEF received from the S-NEF 402 in a storage medium. The AF may use T-NEF to send a modification request or un-subscription request related to the event subscription that has been subscribed to by the AF in the S-NEF. Alternatively, the AF may continue communicating with the S-NEF to send a modification request or un-subscription request related to the event subscription that has been subscribed to by the AF in the S-NEF. The AF 401 may send an event subscription update notify (or notification) ACK (acknowledgment) to the S-NEF 402 to confirm that the AF 401 will receive the event notifications from the T-NEF 403. An event subscription update notification ACK can be indicative of acceptance of the change of destination for subsequent event notifications. The event subscription update notify (or notification) ACK may include an indication that the AF shall communicate with the T-NEF for exchanging the messages related to the subscribed event ID(s). The event subscription update notify (or notification) ACK message may include information of the T-NEF or another NEF that the AF may want to communicate with regarding the subscribed event ID(s). The information relating to this new NEF may include one or more of address of the NEF (IP address(es), IP prefix(es), endpoint address(es), FQDN), port number of the NEF, NEF ID and NEF profile.

The event subscription update notify (or notification) ACK message may include information of another AF (target AF or T-AF) that may communicate with the mobile network regarding the subscribed event ID(s). The information relating to T-AF may include one or more of address of the AF (IP address(es), IP prefix(es), endpoint address(es), FQDN), port number of the AF, AF ID, AF-service-ID and AF profile.

If however, the AF 401 decides to continue receiving the event notifications from the S-NEF 402, the AF 401 may send an event subscription update notify (or notification) NACK (negative acknowledgment) message to the S-NEF 402. The message may include an indication that the AF rejects the request to update the NEF information sent from the S-NEF in Step 45*a* of FIG. 4. In the embodiments wherein the NACK message is sent in Steps 45*b* or FIG. 4, Steps 46*a* and 46*b* of FIG. 4 may be skipped, as the S-NEF will not be transferring the event subscription information to the T-NEF.

Assuming that S-NEF received the event subscription update notify (or notification) ACK in Step 45*b* of FIG. 4, at Step 46*a* of FIG. 4, the S-NEF 402 may send an event subscription context transfer request to the T-NEF 403. An event subscription context transfer request can be indicative of a request to transfer context information at least in part associated with the UE. The message may contain all the information related to the event subscription of the AF, which may be one or more of the information received from the AF when the AF sent the subscription request to the S-NEF (for example AF ID, AF-service-ID, address of the AF (e.g. IP address(es), IP prefix(es), FQDN, endpoint address)), subscribed event ID(s), target of event reporting (e.g. generic public subscription identifier(s) (GPSI(s)) of the UE(s), external group identifier of UE(s)), event reporting information, notification target address (and notification correlation ID), event filter, subscription correlation ID, expire time and the subscription information related to the subscription of the S-NEF to one or more NFs (for example an NEF, AMF, SMF, UDM, PCF, NWDAF) in order to receive event notifications to which the AF subscribed. The S-NEF 402 may include an indication indicating that the AF 401 (or T-AF) shall communicate with the T-NEF 403 regarding the subscribed notifications for event ID(s). As such, the S-NEF may not communicate with the AF after that as the S-NEF has enabled the event subscription content transfer to the T-NEF.

At Step 46*b* of FIG. 4, the T-NEF 403 may send an event subscription context transfer response to the S-NEF 402 to confirm the receipt of the information sent by the S-NEF 402 in Step 46*a* of FIG. 4. An event subscription context transfer response can be indicative of a response to the event subscription context transfer request.

At Step 47*a* of FIG. 4, if the S-NEF 402 received event subscription update notify ACK in Step 45*b* of FIG. 4, and the S-NEF 402 received from the NF-1 404 the message in Step 44*a* of FIG. 4, the S-NEF 402 may send to the NF-1 404 an event subscription update notify ACK in Step 47*a* of FIG. 4 to confirm that event subscription update notify message in Step 44*a* of FIG. 4 is accepted. The NF-1 404 shall send event notifications for the subscribed event ID(s) to the T-NEF 403.

If the S-NEF 402 received an event subscription update notify (or notification) NACK from the AF 401 in Step 45*b* of FIG. 4, and the S-NEF 402 received the event subscription update notify (or notification) message from NF-1 404 in Step 44*a* of FIG. 4, the S-NEF 402 may send an event subscription update notify (or notification) NACK to NF-1 404 in Step 47*a* of FIG. 4, in order to confirm that NF-1 404 shall continue to send event notifications for the subscribed event ID(s) to the S-NEF 402. This message is sent by the S-NEF 402 in order to reject the event subscription update notify (or notification) message sent in Step 44*a* of FIG. 4. Subsequently, NF-1 404 shall continue to send the event notifications for the subscribed Event ID(s) to the S-NEF 402.

At Step 47*b* of FIG. 4, if the S-NEF 402 receives event subscription update notify (or notification) ACK in Step 45*b* of FIG. 4, and the S-NEF 402 received the event subscription update notify (or notification) message from NF-2 405 in Step 44*c* of FIG. 4, the S-NEF 402 may send an event subscription update notify (or notification) ACK to the NF-2 405 in Step 47*b* of FIG. 4, in order to confirm that the event subscription update notify (or notification) message in Step 44*c* is accepted. The event notifications for the subscribed event ID(s) shall subsequently be sent to the T-NEF 403 and thus NF-1 404 shall send the event notifications to the T-NEF 403.

If the S-NEF 402 received event subscription update notify (or notification) NACK in Step 45*b* of FIG. 4, and the S-NEF 402 received the event subscription update notify (or notification) message from NF-2 405 in Step 44*c* of FIG. 4, the S-NEF 402 may send an event subscription update notify NACK to the NF-2 405 to inform NF-2 that the event subscription update notify (or notification) message is rejected. Thus the event notifications messages for the subscribed event ID(s) shall continue to be sent to the S-NEF 402.

In the event subscription update notify (or notification) ACK sent in Step 47*a* or 47*b* of FIG. 4, the S-NEF 402 may include an indication therein that the NF-1 404 or NF-2 405 shall communicate with the T-NEF 403 (not the S-NEF) regarding the subscribed event ID(s). If the NF-1 404 receive that indication, the NF-1 404 may send messages, for example event subscription update notify or event unsubscription messages, to the T-NEF 403.

After Step 47*a* or 47*b* of FIG. 4, if the S-NEF 402 received in Step 45*b* of FIG. 4 an indication that the AF 401 will communicate with the T-NEF 403 regarding subscribed event ID(s), the S-NEF 402 may release or delete all the context information related to these subscribed event ID(s) as S-NEF 402 is no longer providing this information to the AF. In some embodiments, the S-NEF 402 may not receive an indication that the AF will communicate with the T-NEF regarding subscribed Event ID(s) in Step 45*b* of FIG. 4. However, the NF-1 404 or NF-2 405 may communicate with the T-NEF 403 regarding the subscribed event ID(s), e.g. to modify or unsubscribe the subscription for the subscribed event ID(s). As such, the S-NEF 402 may release or delete all the context information related to this subscribed Event ID(s).

At Step 47c of FIG. 4, if the NF-2 405 received the event subscription update notify (or notification) ACK from the S-NEF 402 in Step 47b of FIG. 4, the NF-2 405 may send to the NF-1 404 an event subscription update notify (or notification) ACK. This may confirm that the event subscription update notify (or notification) message in Step 44b of FIG. 4 is accepted. The NF-1 404 may send event notifications for the subscribed event ID(s) to the T-NEF 403.

If the NF-2 405 received the event subscription update notify (or notification) NACK from the S-NEF 402 in Step 47b of FIG. 4, the NF-2 405 may send to the NF-1 404 an event subscription update notify (or notification) NACK. This may confirm that the event subscription update notify (or notification) message received in Step 44b of FIG. 4 is rejected. The NF-1 404 may send event notifications for the subscribed event ID(s) to the S-NEF 402.

At Step 48 of FIG. 4, if the event subscription update notify (or notification) ACK was received in Step 47a or 47c, the NF-1 404 may send the event notifications for the subscribed event ID(s) to the T-NEF 403. Otherwise, if the event subscription update notify (or notification) NACK was received in Step 47a or 47c, the NF-1 404 may send the event notifications for the subscribed event ID(s) to the S-NEF 402.

At Step 49 of FIG. 4, if the T-NEF 403 received the event notifications of subscribed event ID(s), the T-NEF 403 may send the event notifications to the AF 401 or the T-AF.

According to various embodiments, the messages illustrated and discussed with respect to FIG. 4 as well as other messages illustrated and discussed with respect to other figures herein, may be implemented by new services of NFs or by the modification of some existing services of NFs. Some existing services of NFs may be modified as described further below in order to provide at least in part the notifications or messages that have been discussed elsewhere herein. It is understood that the examples of the services providing the messages are non-limiting and other service configurations or modifications may be configured to provide the messaging discussed above with respect to FIG. 4 or other figures as further discussed elsewhere herein.

According to some embodiments, the NF, for example one or both of NF-1 and NF-2, is an AMF. As such an AMF is configured to send the messages in Step 44a, 44b, or 44c of FIG. 4. In this regard, the Namf_EventExposure_Notify service may be used to send the event subscription update notify (or notification) messages.

As an example, the Namf_EventExposure_Notify service is configured to provide the previously subscribed event information to the NF consumer which has subscribed to that event before. This service further provides a new address of the new event receiving NF. As input for this service, the information required may include one or more of AMF ID (e.g. globally unique AMF identifier (GUAMI)), notification correlation information, event ID, corresponding UE ID (e.g. subscription permanent identifier (SUPI) and if available GPSI), time stamp. Optionally, the information for input may include event specific parameter list, new notification target address, new notification target NF ID, notification target address. It is understood that there may be no required output from this service, however the output from this service may include one or more of ACK, NACK, "use new notification target address for future messages" indication. The notification target address may be the address of the current event receiving NF. The new notification target address is the address of the new event receiving NF to replace the current event receiving NF. The set of event ID, new notification target address (and optional notification target address) and notification correlation information may be used by the event receiving NF to identify the currently subscribed event ID(s) and the new event receiving NF that shall receive the event notifications for the subscribed event ID(s). The parameter "use new notification target address for future messages" indication may be for the current NF service consumer to indicate that the NF service provider will communicate with the new NF service consumer having the new notification target address and/or NF ID in the future.

For example, the new notification target address may be set to the address of the T-NEF, the notification target address may be set to the address of the S-NEF. If the event receiving NF accepts the update of the new event receiving NF, the NF service consumer sends an ACK to the NF service producer, which in this example is the AMF. If the event receiving NF rejects the update of the new event receiving NF, the NF service consumer sends a NACK to the NF service producer, which in this example is the AMF.

As a further example, the new notification target address may be set to the address of the T-NEF 403, the notification target address may be set to the address of the S-NEF 402. The NF-1 404 (which in this example is the AMF) may send Namf_EventExposure_Notify message to the S-NEF 402 in Step 44a, 44b, or 44c of FIG. 4. The event receiving NF (or NF service consumer, e.g. S-NEF 402) may send Namf_EventExposure_Notify including ACK or NACK to the AMF (e.g. the NF-1 404) in Step 47a, 47b, 47c of FIG. 4.

In some embodiments, a new service may be configured in order to provide the desired functionality when the NF is an AMF. In this embodiment, a Namf_EventExposure_Update service of the AMF may be configured to carry the event subscription update notify (or notification) message. For example, a service called Namf_EventExposure_UpdateNotify may be configured for the AMF to provide a new address of the new event receiving NF. The input for this service may include AMF ID (GUAMI), notification correlation information, event ID, corresponding UE (SUPI and if available GPSI), time stamp. In addition, other input for this service may include one or more of new notification target address and notification target address. The output of this service may include ACK or NACK. In addition, this service may use the new notification target address for future messages. The notification target address may be the address of the current event receiving NF. The new notification target address may be the address of the new event receiving NF which is to replace the current event receiving NF.

For the Namf_EventExposure_UpdateNotify service, according to embodiments, the set of event ID, new notification target address (and optionally the notification target address) and notification correlation information may be used by the event receiving NF to identify the currently subscribed event ID(s) and the new event receiving NF that shall receive the event notifications for the subscribed event ID(s). The parameter "use new notification target address for future messages" may be for the current NF service consumer to indicate that the NF service provider will communicate with the new NF service consumer having the new notification target address and/or NF ID in the future. If the event receiving NF accepts the update of the new event receiving NF, the NF service consumer sends an ACK to the NF service producer, which in this example is the AMF. If the event receiving NF rejects the update of new event receiving NF, the NF service consumer sends a NACK to the NF service producer, which in this example is the AMF.

As an example of the Namf_EventExposure_UpdateNotify service, the new notification target address may be set to the address of the T-NEF, the notification target address may be set to the address of the S-NEF. The NF-1 404 (which in this example is the AMF) may send Namf_EventExposure_UpdateNotify message to the S-NEF 402 in Step 44a, 44b, or 44c of FIG. 4. The event receiving NF (e.g. S-NEF 402) may send Namf_EventExposure_UpdateNotify including ACK or NACK to the AMF (which in this example is the NF-1 404) in Step 47a, 47b, or 47c of FIG. 4.

According to some embodiments, the NF, for example one or both of NF-1 and NF-2, is a UDM. As such a UDM is sending the messages in Steps 44a, 44b and 44c of FIG. 4, wherein the UDM may use Nudm_EventExposure_Notify in this regard. This service is configured such that the UDM (which in this example is NF-1 or NF-2) reports the event to the consumer that has previously subscribed.

According to some embodiments, the Nudm_EventExposure_Notify service may be configured as follows. The inputs for this service may include event ID, notification correlation information and time stamp. Other inputs may include one or more of following parameters: an event specific parameters list, new notification target address, new notification target NF ID and notification target address. According to some embodiments, the output of this service may be an ACK or NACK. The UDM may use this service to notify the NF service consumer the new notification target address that may receive event notifications.

In some embodiments, a new service may be configured in order to provide the desired functionality when the NF is an UDM. In this embodiment, for example a Nudm_EventExposure_UpdateNotify service may be used to notify the NF consumer the new notification target address of the events to which the NF consumer had previously subscribed. Input to this service may include event ID, notification correlation information and time stamp. Other inputs may include one or more of following parameters: new notification target address, new notification target NF ID and notification target address. The outputs may include an ACK or NACK. In addition, this service may use the new notification target address for future messages.

According to some embodiments, the NF, for example one or both of NF-1 and NF-2, is a PCF. As such a PCF is sending the messages in Steps 44a, 44b and 44c of FIG. 4, wherein the PCF may use Npcf_EventExposure_Notify service to update the new T-NEF which will receive the event notifications. The event receiving NF (e.g. the S-NEF) may use Npcf_EventExposure_Notify with ACK or NACK. When the event receiving NF (e.g. the S-NEF) sends a response message Npcf_EventExposure_Notify with ACK in Step 47a, 47b, 47c of FIG. 4, the event receiving NF may include the parameter "use new notification target address for future messages" to confirm that the new event receiving NF will communicate with the PCF (which is the NF-1 and/or NF-2, in this example) regarding the subscribed event notifications.

According to embodiments, Npcf_EventExposure_Notify service may be configured to reports the event to the consumer that has previously subscribed. The inputs may include event ID, corresponding UE ID (GPSI), notification correlation information and time stamp. Other inputs for this service may include one or more of new notification target address, new notification target NF ID and notification target address. The outputs may include an ACK or NACK. The PCF may use this service to notify the NF service consumer the new notification target address that may receive the event notifications.

According to some embodiments, the PCF may configured to use a new service, for example Npcf_EventExposure_UpdateNotify service to send updates to the event receiving NF (e.g. the S-NEF) about the new event receiving NF (e.g. the new T-NEF) which will receive the event notifications.

In some embodiments, this new service may be a Npcf_EventExposure_UpdateNotify service which may be used to update the new notification target address of NF consumer. The inputs may include event ID, corresponding UE ID (GPSI), notification correlation information (e.g. notification correlation ID) and time stamp. Other inputs may include one or more of following parameters: new notification target address, new notification target NF ID and notification target address. The outputs may include an ACK or NACK. The PCF may use this service to notify the NF service consumer the new notification target address that may receive event notifications.

According to embodiments the event receiving NF (e.g. the S-NEF) may send Npcf_EventExposure_UpdateNotify with ACK, or NACK to the PCF. When the event receiving NF (e.g. the S-NEF) sends the acknowledgment message for the Npcf_EventExposure_UpdateNotify with ACK, the S-NEF may include the parameter "use new notification target address for future messages". In this instance; the PCF (which is the NF-1 and/or NF-2 in this example) may use the response parameter "use new notification target address for future messages" as a confirmation from the S-NEF to use the T-NEF for future communications regarding the subscribed event notifications.

According to some embodiments, the NF, for example one or both of NF-1 and NF-2, is an SMF. As such an SMF is sending the messages in Steps 44a, 44b and 44c of FIG. 4, wherein the SMF may use Nsmf_EventExposure_Notify service to send the event subscription update notify (or notification) message.

According to embodiments the Nsmf_EventExposure_Notify service may be used to update the new notification target address of NF consumer. The inputs may include one or more of following parameters: event ID, notification correlation information, UE ID (SUPI and if available GPSI), PDU session ID and time stamp. Other input may include one or more of following parameters: an event specific parameter list, which in some embodiments, may be considered as similar to those as currently described for a SMF configuration in the standard, for example as described in Clause 5.2.8.3.1 of TS 23.502. Other input may include one or more of following parameters: new notification target address, new notification target NF ID and notification target address. The output of the response may include a result indication. Other output may include one or more of following parameters: redirection information, may be an ACK or NACK. The SMF may use this service to notify the NF service consumer the new notification target address that may receive event notifications.

According to some embodiments, when the SMF (which is the NF-1 and/or NF-2 in this example) detects the event subscribed by the NF consumer requests the S-NEF to update the new notification target address, the SMF may send details defining the subscribed event together with the notification target address, for example with a notification correlation ID, to the event receiving NF (e.g. S-NEF) and may include new notification target address, new notification target NF ID and notification target address.

According to embodiments, the event receiving NF (e.g. the S-NEF) may use Nsmf_EventExposure_Notify with ACK, NACK in Step 47a, 47b, or 47c of FIG. 4 to acknowledge the message Nsmf_EventExposure_Notify that was sent from the SMF, which in this example is the NF-1 and/or the NF-2. When the event receiving NF sends the message Nsmf_EventExposure_Notify with ACK, the event receiving NF may include "use new notification target address for future messages" parameter to confirm that the new event receiving NF with the new notification target address will communicate with the SMF, which in this example is the NF-1 and/or the NF-2, in the future regarding the subscribed event notifications.

In some embodiments, the SMF, which in this example is the NF-1 and/or the NF-2, may alternatively use a new service Nsmf_EventExposure_UpdateNotify in Step 44a, 44b, 44c of FIG. 4. The SMF may use Nsmf_EventExposure_UpdateNotify service to send the event subscription update notify (or notification) message.

The Nsmf_EventExposure_UpdateNotify service may be configured to update the new notification target address of NF consumer. The input may include event ID, notification correlation information, UE ID (SUPI and if available GPSI), PDU Session ID and time stamp. In some embodiments, other inputs may include an event specific parameter list, which in some embodiments, may be considered as similar to those as currently described for a SMF configuration in the standard, for example as described in Clause 5.2.8.3.1 of TS 23,502. Other inputs may include one or more of new notification target address, new notification target NF ID and notification target address. The output of this service may include a result indication. Other outputs may include redirection information, may be an ACK or NACK. The SMF may use this service to update the NF service consumer the new notification target address that may receive event notifications.

In some embodiments the event receiving NF (e.g. S-NEF) may send an acknowledgment in Step 47a, 47b, 47c of FIG. 4 by sending Nsmf_EventExposure_UpdateNotify with ACK, or NACK. When the event receiving NF (e.g. S-NEF) sends an acknowledgment in Step 47a, 47b, 47c of FIG. 4 by sending Nsmf_EventExposure_UpdateNotify with ACK, the event receiving NF may include the parameter "use new notification target address for future messages" as a confirmation that the SMF (which in this example is the NF-1 and/or NF-2) will communicate with the new event receiving NF regarding subscribed event notifications.

According to some embodiments, the NF, for example one or both of NF-1 and NF-2, is a NEF. As such a NEF is configured to send messages in Step 44a and 44c of FIG. 4, wherein the NEF may use a service of the NEF to send event subscription update notify (or notification) and to receive event subscription update notify ACK/NACK in step 47a and 47b. For example, the NEF (which in this example is NF-1 and/or NF-2) may provide a service Nnef_Update_Subscribed_Event.

According to embodiments, Nnf_Update_Subscribed_Event service may be configured to update the new notification target address of NF consumer. The input may include event ID, notification correlation information, UE ID (SUPI and if available GPSI), UE group ID (e.g. external group ID, internal group ID), new notification target address, new notification target NF ID, notification target address, subscription correlation ID, new subscription correlation ID and time stamp information. Outputs: ACK, NACK. The outputs may include an ACK or NACK. The NF may use this service to notify or update the NF service consumer the new notification target address of the NF that may receive event notifications. According to embodiments, when the output includes ACK, the one or more parameters including new notification correlation information (e.g. notification correlation ID), use new notification target address for future messages and new expire time may be included with the output.

A NF service consumer (e.g. S-NEF) has subscribed for one or more of event ID(s). When the NF service consumer sends the subscription message, the NF service consumer provides the notification target address (e.g. IP address(es), IP prefix(es), FQDN(s)) of the event receiving NF that receives the event notifications, notification correlation information (such as notification correlation ID), the target of event reporting (e.g. UE ID, UE group ID (e.g. external group ID, internal group ID) and some other parameters. The event reporting NF (or NF service producer, e.g. AMF, SMF, UDM, PCF) provides the NF service consumer (e.g. S-NEF) with the subscription correlation ID.

When the event reporting NF, which in FIG. 4 is NF-1 and/or NF-2, which may be AMF, SMF, UDM, PCF, for example, wants to change the event receiving NF, the event reporting NF may send to the NF service consumer (e.g. S-NEF, SMF, UDM, PCF, AMF, AF) a message. This message may be configured as a Nnf_Update_Subscribed_Event message, where the "Nnf" in the name of the message may be "Nnef", "Nsmf", "Nudm", "Npcf", "Namf" or "Naf" when the event reporting NF is a NEF, SMF, UDM, PCF, AMF or AF respectively. The message may include one or more of following parameters: event ID, notification correlation information, UE ID (SUPI and if available GPSI), new notification target address, new notification target NF ID, notification target address, subscription correlation ID, new subscription correlation ID and time information. Having particular regard to these parameters, the event ID is the event ID to which the NF service consumer has subscribed, the new notification target address (e.g IP address(es), IP prefix(es), FQDN(s) which defines the new event receiving NF), the new notification target NF ID is the NF ID which defines the new event receiving NF, the notification target address is the address of the current event receiving NF, the subscription correlation ID may be used to help the NF service consumer to identify the event Reporting NF and the time information may indicate the time the event reporting NF will start sending the event notifications to the new event receiving NF. The new subscription correlation ID may provide the new event reporting NF with information to correlate the new event receiving NF and subscribed event ID(s) may to be reported to the new event receiving NF. In some embodiments, if a new expire time is not included in this message, the current expire time that was sent to the event reporting NF, when the NF (service consumer) subscribed to the one or more of event ID(s) to receive event notifications reported by the Event Reporting NF, may be used.

The NF (service consumer NF, e.g. S-NEF which may alternately be an SMF, UDM, PCF, AMF, AF) may send a response to the event reporting NF (or service producer) by using Nnf_Update_Subscribed_Event with one or more of output parameters that may include one or more of: ACK, NACK, use new notification target address for future messages and a new expire time. If the request to update the new event receiving NF is rejected, the NF may send a message Nnf_Update_Subscribed_Event with output including the NACK indication. If the new event receiving NF is accepted, the NF may send a message Nnf_Update_Subscribed_Event with output including the ACK indication, and the output may include one or more of new notification correlation information (e.g. notification correlation ID), use new notification target address for future messages and a new expire time. The new notification correlation information may be produced by either the NF (e.g. NF service producer, or the S-NEF) or the new event receiving NF (e.g. the T-NEF) to identify the subscribed event ID(s) relating to the event notification(s) that are sent to the new event receiving NF. The parameter "use new notification target address for future messages" may be provided to confirm that the NF (NF service consumer) will communicate with the new event reporting NF regarding subscribed event ID(s) wherein this event notification(s) will be sent to the new event receiving NF. The new expire time may be produced by either the NF or the new event receiving NF, in order to indicate when the subscribed event ID(s) may expire.

In the described services, if the parameter "use new event reporting NF for future messages" is absent, the NF service consumer may continue communicating with the current NF service producer to modify or unsubscribe for the subscribed event ID(s); and the new event receiving NF will receive event notifications to the event reporting NF.

For example, in the message at Step 44a of FIG. 4, the NF-1 404 is an SMF and may send to the S-NEF 402 a message Nsmf_Update_Subscribed_Event which may include one or more of input parameters event ID, notification correlation information (which was produced by the S-NEF when the S-NEF subscribed to receive event notification(s) of the SMF), UE ID (SUPI and if available GPSI), new notification target address of the T-NEF, new notification target NF ID of T-NEF, notification target address of S-NEF, subscription correlation ID (which was produced by the SMF when the S-NEF subscribed to receive event notification(s) of the SMF), new subscription correlation ID produced by the SMF, time stamp information. Furthermore, in the message at Step 47a of FIG. 4, if the S-NEF 402 rejects the update sent in step 44a, the S-NEF may send Nsmf_Update_Subscribed_Event message including NACK. If the S-NEF accepts the update sent in step 44a, the S-NEF may send Nsmf_Update_Subscribed_Event message including ACK, wherein the message may include one or more parameters: new notification correlation information (e.g. notification correlation ID, which could be produced by either S-NEF or T-NEF), use new notification target address for future messages and a new expire time.

As an example, in Step 45a of FIG. 4, the S-NEF 402 may use a service Nnef_EventExposure_Notify service of the NEF to send event subscription update notify (or notification) message to the AF 401. The Nnef_EventExposure_Notify service may be configured to report the event to the service consumer that has previously subscribed to the events. The NEF updates the new NEF (e.g. T-NEF) that reports the event notifications to the AF. Inputs may include one or more of parameters: event ID, notification correlation information and time stamp. Other inputs may include one or more of event information (described on a per Event ID basis), new event reporting NF ID (e.g. the T-NEF ID), new event reporting NF address (e.g. IP address(es), IP prefix(es), FQDN(s) of the T-NEF), NF profile of new event Reporting NF ID, new subscription correlation ID and time information. The outputs may include operation execution result indication, may be an ACK or NACK. When the output includes ACK, one or more of following parameters may be further included in the output, new notification correlation information (e.g. notification correlation ID), "use new event reporting NF for future messages" parameter, and a new expire time.

According to embodiments, the S-NEF 402 may send event subscription update notify (or notification) message in Step 45a of FIG. 4 to the AF 401 by using Nnef_EventExposure_Notify message with one or more of input parameters including event ID(s), notification correlation information, time stamp, new event reporting NF ID (e.g. the T-NEF ID), new event reporting NF address (e.g. IP address(es), IP prefix(es), FQDN(s) of the T-NEF 403), new subscription correlation ID (produced by the S-NEF 402) and time information. The event ID(s) may indicate the events to which the AF 401 has subscribed before and the S-NEF 402 notifies the AF 401 that the event notifications of event ID(s) will be sent to the AF 401 from the new T-NEF 403. The T-NEF 403 may be identified by the new event reporting NF ID and/or new event reporting NF address, and/or NF profile of new event reporting NF ID. The new subscription correlation may be provided by the S-NEF 402 or T-NEF 403 to identify the subscriptions of the AF 401 in the T-NEF 403. The time information may indicate the time period the T-NEF 403 may be used to communicate with the AF 401 regarding the subscribed event ID(s).

According to embodiments, the AF 401 may send Event Subscription Notify ACK/NACK in Step 45b of FIG. 4 by using Nnef_EventExposure_Notify message with output parameters including ACK or NACK. If the AF rejects the update message sent in Step 45a of FIG. 4, the Nnef_EventExposure_Notify message may include an output parameter NACK. If the AF 401 accepts the update message sent in Step 45a of FIG. 4, the Nnef_EventExposure_Notify message may include an output parameter ACK, and one or more parameters including new notification correlation information (e.g. notification correlation ID), "use new event reporting NF for future messages" parameter, and a new expire time. The new notification correlation information may be used by the S-NEF 402 or AF 401 to identify the subscriptions of the AF 401 for the event ID(s) that will be reported by the T-NEF 403. The parameter "use new event reporting NF for future messages" provides the AF 401 with the ability to confirm that the AF 401 will communicate with the T-NEF 403 regarding subscribed event ID(s). The new expire time indicates when the subscription to the T-NEF 403 for the event ID(s) may be expire. In some embodiments if the parameter "use new event reporting NF for future messages" is absent, the AF 401 may continue communicating with the S-NEF 402 to modify or unsubscribe for the subscribed event ID(s) and the new event reporting NF (e.g. T-NEF 403) may report event notifications to the AF 401.

In some embodiments, the AF 401 may provide a service, e.g. Naf_Event_Subscription_Update, for other NFs (e.g. NEF) to update the subscriptions of the AF. The Naf_Event_Subscription_Update service may provide a means for the event reporting NF to update the new event reporting NF that reports the event notifications to the AF. The inputs may include event ID, notification correlation information, time stamp, new event reporting NF ID (e.g. the T-NEF ID), new event reporting NF address (e.g. IP address(es), IP prefix(es), FQDN(s) of the T-NEF), NF profile of new event reporting NF ID, new subscription correlation ID and time information. The output may include an ACK or NACK. When the output includes ACK, one or more parameters may be included in the output wherein the parameters may be new notification correlation information (e.g. notification correlation ID), "use new event reporting NF for future messages" parameter, and a new expire time.

According to embodiments the message in Step 46a and 46b of FIG. 4 may be implemented by a service of NEF, for example Nnef_EventSubscriptionContext_Transfer request and response, respectively. The Nnef_EventSubscriptionContext_Transfer service may enable the NF service consumer (e.g. S-NEF) to transfer the event subscription information to another NF service producer (e.g. T-NEF). The NF service consumer and NF service producer may be in the same or different NF Sets, or may be in the same or different NF service sets. Inputs for this service may include some or all the information related to the subscribed event IDs, including one or more of the information received from the AF when the AF sent the subscription request to the S-NEF (e.g. AF ID, AF-service-ID, address of the AF (e.g. IP address(es), IP prefix(es), FQDN, endpoint address)), subscribed event ID(s), target of event reporting (e.g. GPSI(s) of the UE(s), external group identifier, internal group ID), event reporting information, notification target address, and notification correlation ID, event filter, subscription correlation ID and expire time. The information may also include subscription information related to the subscription of the S-NEF to one or more NFs (e.g. NF-1 or NF-2 which may be configured as a AMF, SMF, UDM, PCF, NWDAF) in order to receive event notifications to which the AF has subscribed. In some embodiments, "release event subscription in the S-NEF" parameter may be used by the S-NEF which may indicate that the AF (or T-AF) shall communicate with the T-NEF regarding the subscribed event notifications for event ID(s). The S-NEF may not communicate with the AF after that as communication has been transferred to the T-NEF.

In some embodiments, the T-NEF 403 may generate a new subscription correlation information which may be used to identify the subscribed event ID(s) that were transferred from the S-NEF 402 to the T-NEF 403. The T-NEF 403 may send the new subscription correlation information to the S-NEF in step 46b.

In some embodiments, the T-NEF 403 may send the new subscription correlation information to the AF 401 by using one of the services of the NEF or AF, however this message has not been illustrated in FIG. 4. After receiving the new subscription correlation information from the T-NEF 403, the AF 401 may send a new notification correlation ID to the T-NEF 403 so that the T-NEF 403 may identify the message from the AF 401 for modifying and unsubscribing the respective subscriptions of event ID(s).

The embodiments discussed above with respect to FIG. 4 may allow an event reporting NF (or a service producer) of a mobile network to update or notify the event receiving NF (or a service consumer) about a new event reporting NF (or a new service producer). These embodiments may allow the re-selection of NF, such as NEF to transfer network information to another entity, such as AF when the current NEF is no longer considered optimal because of some reasons, such as UE mobility, load balancing, denial of service attacks.

Figure 5:
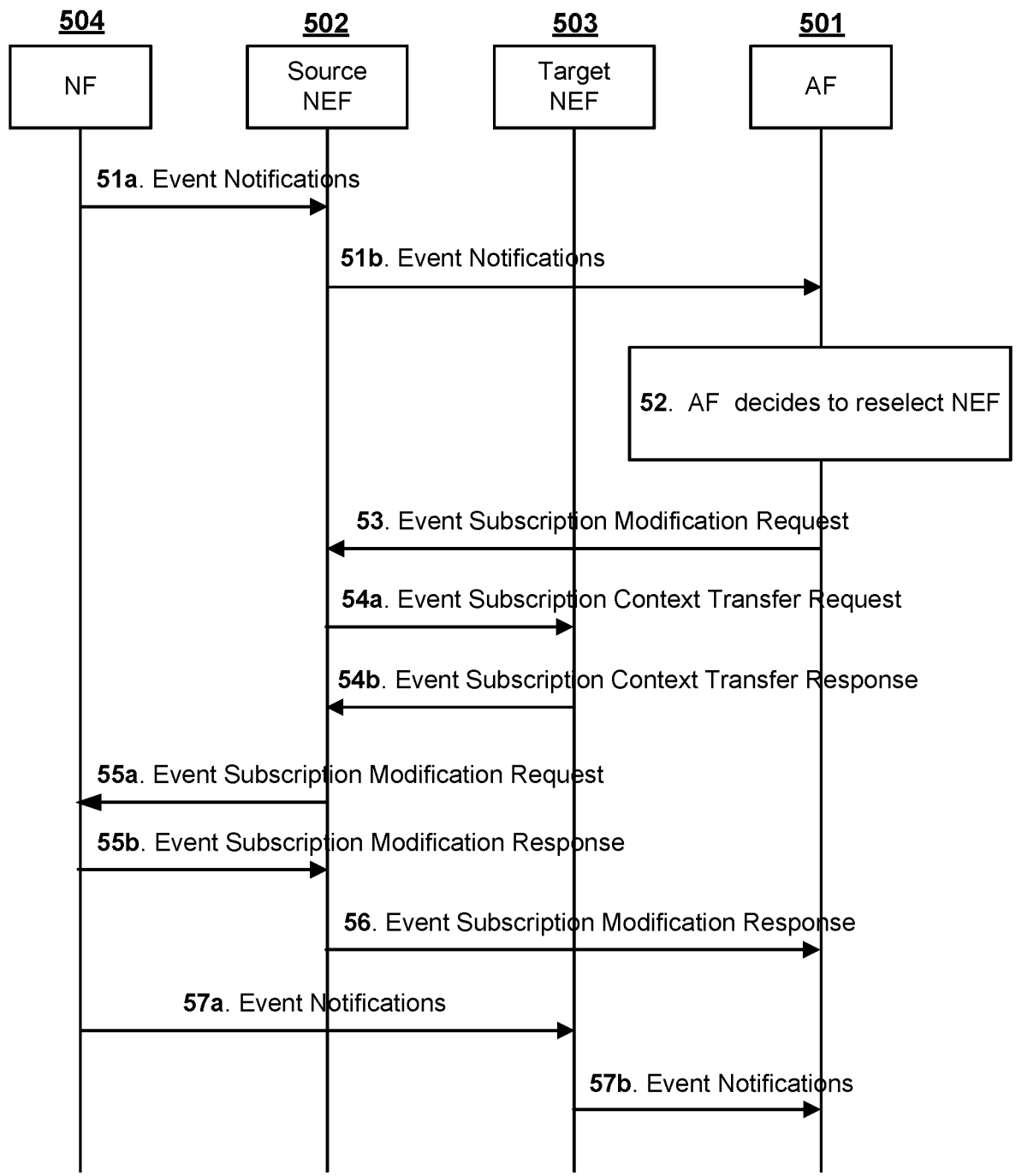
FIG. 5 illustrates a method for using an application function (AF) to reselect a network exposure function (NEF), according to embodiments.

In some embodiments of the present disclosure, the event subscription context transfer may be triggered by the AF, in other words these embodiments may allow an AF to re-select a NEF. In this method, the AF, NEF, and other NFs may process two messages, namely in order to subscribe and unsubscribe for an event ID. These embodiments may provide a means for the reduction of the number of messages required for modifying an existing event subscription. FIG. 5 illustrates a signal flow diagram for supporting NEF re-selection that is triggered by the AF. These embodiments can provide a means for reduction of communication with an AF during reselection of a NEF, for example transferring from a S-NEF to a T-NEF.

At Step 51a of FIG. 5, a NF 504 reports event notifications to the S-NEF 502. The message may include an indication for reselection of the NEF. At Step 51b of FIG. 5, the S-NEF 502 may send the event notifications to the AF 501, wherein the message may include an indication of a request for the AF 501 to re-select a new NEF.

At Step 52 of FIG. 5, the AF 501 may decide or determine to re-select another NEF. The cause for this determination could be that the AF 501 receives in Step 51b of FIG. 5 an indication from the S-NEF 502 to request re-selection of the NEF. Another cause for this determination could be that the AF 501 receives location information of the UE that moves to a new location, that could be outside the service area, or outside the core service area, or outside the extended service area of the S-NEF 502. The AF 501 may use UE mobility information to decide whether a new NEF may be selected. The AF 501 may discover new NEF(s) by using a service of NRF. The NRF may provide the AF 501 with one or more NF profiles of NEF instances, or NEF service instances. The AF 501 may select one of the NEFs from the received information provided by the NRF. Another method to discover NEFs is to use local configuration information about available NEF instances which had be previously stored in the AF 501. After receiving the NEF information from the NRF, the AF 501 may use this information and other information to select an NEF, wherein the information may include one or more of UE location, UE mobility information, NEF profile, NEF service area, NEF core service area and NEF extended service area.

According to embodiments, the AF 501 may select or re-select an NEF at substantially any time. For example, the reselection may occur during a handover procedure where the UE is being handed over from one serving radio node to another radio node or at a time when the UE is not in the handover procedure. However, it may be advantageous to reselect an NEF when a UE is not in the handover procedure as this may avoid signaling delay that could happen during the UE handover procedure.

At Step 53 of FIG. 5 the AF 501 may send a message event subscription modification request to the S-NEF 502. An event subscription modification request can be indicative of a change of destination for subsequent event notifications. For example the destination can be considered to be the UE, or application function (AF) or a network function that is configured to receive the event notifications. The message may contain information of the new event receiving NF (e.g. the T-NEF 503), the event ID(s), time information, expire time, notification correlation information, subscription correlation information, new notification correlation information and use new event receiving NF for future messages. The information relating to the T-NEF 503 may include NF ID of the T-NEF 503. The event ID(s) may be reflective of the event notification subscription to be modified. The time information may be indicative of the time the modification may take place and "expire time" may indicate when the new subscription to the T-NEF 503 may expire. The notification correlation information may be a notification correlation ID, which has been provided by the AF 501 to the S-NEF 502 when the AF 501 first subscribed to S-NEF 502 for event reports of event ID(s), so that the S-NEF 502 could identify the subscription information of the AF 501 related to the event ID(s). The subscription correlation information (e.g. subscription correlation ID) has been generated by the AF 501 and provided to the S-NEF 502 when the AF 501 first subscribed S-NEF 502 for event notification of the Event ID(s). The subscription correlation Information may be used by the S-NEF 502 to identify the subscription information in the S-NEF 502 related to the subscribed event ID(s). The new notification correlation information (e.g. a new notification correlation ID) may define the information generated by the AF 501 so that the S-NEF 502 and AF 501 may use this information to identify that the event report (or event notification) relates to which subscription of the AF 501. The parameter "use new event receiving NF for future messages" may be included in the message for the AF 501 to request that the T-NEF 503 shall communicate with the AF 501 regarding the subscribed event ID(s). The S-NEF 502 may release all the information (or context information) related to the event ID(s) and may not communicate with the AF 501 regarding the subscription of event ID(s).

For example, if the AF 501 subscribes to 10 event IDs with the S-NEF 502, the AF 501 may send event subscription modification request for only some of these event IDs, for example for 2 event ID(s), of the subscribed event ID(s).

At Step 54a of FIG. 5, the S-NEF 502 may send a message, e.g. event subscription context transfer request, to the T-NEF 503 to transfer the event subscription information to the T-NEF 503. An event subscription context transfer request can be indicative of a request to transfer context information associated at least in part with the UE. The message may contain information relating to the event subscriptions of the AF 501, which may include one or more of: (1) the information received from the AF 501 when the AF 501 first sent the subscription request to the S-NEF 502 (e.g. AF ID, AF-service-ID, address of the AF 501 (e.g. IP address(es), IP prefix(es), FQDN, endpoint address)), event ID(s), target of event reporting (e.g. GPSI(s) of the UE(s), external group identifier), event reporting information, notification target address (e.g. the address of the AF), notification correlation ID (e.g. the new notification correlation ID the S-NEF 502 received in Step 53 of FIG. 5 from the AF 501), event filter, subscription correlation ID (which was generated by the S-NEF 502 corresponding to the AF 501 subscription for an event ID) and expire time; (2) the one or more information received from the AF 501 sent in the message at Step 53 of FIG. 5; (3) the subscription information related to the subscription of the S-NEF 502 to the NF 504 in order to receive event reports (or notifications) that subscribed by the AF 501. The subscription information related to event subscription to NF may include one or more of NF ID, S-NEF ID, target of event reporting, (set of) event ID(s), notification target address (which is the address of S-NEF 502), and notification correlation ID (which was generated by the S-NEF 502 when the S-NEF 502 subscribed NF for the event report (or event notification)), event reporting information. event filter(s) associated with each event ID; event filter(s), subscription correlation ID (which could has been generated by the S-NEF 502 when the S-NEF 502 first subscribed NF for the event report (or event notification) in case of modification of the event subscription) and expiry time.

At Step 54b of FIG. 5, the T-NEF 503 may send event subscription context transfer response to the S-NEF 502. In some embodiments this message may be similar to the message described in Step 46b of FIG. 4. In this event subscription context transfer response, the T-NEF 503 may include one or more of T-NEF ID, notification target address (which is the address of T-NEF 503), notification correlation information (e.g. notification correlation ID generated by the T-NEF 503), subscription correlation ID (which is generated by the T-NEF 503 in case of modification of the event subscription).

At Step 55a of FIG. 5, the S-NEF 502 may send a message, e.g. event subscription modification request, to the NF 504 to modify the subscription information of one or more previously subscribed event ID(s). An event subscription modification request can be indicative of a change of destination for subsequent event notifications. For example the destination can be considered to be a UE, or application function (AF) or a network function that is configured to receive the event notifications. The message may include information relation to one or more of information of the new event receiving NF (e.g. the T-NEF 503), the subscribed event ID(s), time information, expire time, notification correlation information, new notification correlation information, subscription correlation information, and a parameter "new subscription correlation information and use new event receiving NF for future messages".

Having regard to the above information, in embodiments, the information of the T-NEF 503 may include the address of the T-NEF 503, the NF ID of the T-NEF 503. The event ID(s) of the event notification subscription to be modified. The time information to indicate the time the subscription modification may take place, "expire time" to indicate when the new subscription of the T-NEF 503 may expire. The notification correlation information could be notification correlation ID, which has been provided by the S-NEF 502 to the NF 504 when the S-NEF 502 first subscribed NF 504 for event report (or event notification) of the event ID(s), for example the NF 504 may send notification correlation information when sending the event report to the S-NEF 502 related to the event ID(s). The new notification correlation information (which could be, e.g. a new notification correlation ID) is the information generated by the S-NEF 502 or the T-NEF 503 so that the S-NEF 502 or T-NEF 503 and NF 504 may use to identify the subscription of the T-NEF 503 for the event ID(s) of the NF 504. The NF 504 may send an event report and new notification correlation information to the T-NEF 503. The subscription correlation information (e.g. subscription correlation ID) has been generated by the S-NEF 502 when the S-NEF 502 first subscribed NF 504 for the event report (or notification) of the event ID(s) of NF 504. The subscription correlation information may be used by the NF 504 and S-NEF 502 when modifying the subscription information in the NF 504 related to the subscribed event ID(s). The new subscription correlation information (e.g. a new subscription correlation ID) was generated by the T-NEF 503 and provided to the S-NEF 502 in Step 54b of FIG. 5. The new subscription correlation information may be used by the NF 504 and T-NEF 503 when modifying the subscription information in the NF 504 related to the subscribed event ID(s) of the T-NEF 503. The parameter "use new event receiving NF for future messages" may be included for the S-NEF 502 to request that the NF 504 shall communicate with the T-NEF 503 regarding the subscribed event ID(s). The S-NEF 502 may release (or delete) all the information related to the event ID(s) and may not communicate with the NF 504 regarding the subscription of event ID(s) in the future, as this would be subsequent to the transfer thereof to the T-NEF 503.

At Step 55b of FIG. 5, the event reporting NF 504, may send to the S-NEF 502 a message, e.g. event subscription modification response. The message may include one or more of, information relating to when the request for S-NEF 502 in Step 55a of FIG. 5 is accepted: (1) new subscription correlation information and (2) expire time. The new subscription correlation information could be a new subscription correlation ID that the NF 504 received in Step 55*a* of FIG. 5.

At Step 56 of FIG. 5, the S-NEF 502 may send a message, e.g. an event subscription modification response, to the AF 501. The message may include information relating to one or more of notification correlation information, new notification correlation information, subscription correlation information, new subscription correlation information and time information. The notification correlation information and new notification correlation Information was provided by the AF 501 in Step 53 of FIG. 5. The subscription correlation information could be the existing subscription correlation information generated by the AF 501 and provided to the S-NEF 502 when the AF 501 first subscribed S-NEF 502 for event reports of the event ID(s). The new subscription correlation information could be a new subscription correlation ID generated by the AF 501 and provided to the S-NEF 502 in Step 53 of FIG. 5. The time information may indicate the time when the T-NEF 503 may start sending event notification to the AF 501, and/or the time the S-NEF 502 may stop sending event notifications for the event ID to the AF 501.

At Step 57*a* of FIG. 5, the event reporting NF 504 may send event reports (or notifications) to the T-NEF 503. The message may include information relating to one or more of event ID, time stamp, event information (or event report, or event notification), notification correlation information and new notification correlation information. The notification correlation information may be generated by the S-NEF 502 when the S-NEF 502 first subscribed to receive the event notification(s) provided by the event reporting NF 504. The new notification correlation information may be generated by the T-NEF 503 (or S-NEF 502). The T-NEF 503 provided the new notification correlation information to the S-NEF 502 in Step 54*b* of FIG. 5, and the S-NEF 502 may send the new notification correlation information in the event subscription modification request in Step 55*a* of FIG. 5 to the NF 504.

At Step 57*b* of FIG. 5, the T-NEF 503 may forward the event report received from the event reporting NF 504 in Step 57*a* of FIG. 5 to the AF 501. The message may include information relating to one or more of event ID, time stamp, event information (or event report, or event notification), notification correlation information, new notification correlation information subscription correlation information and new subscription correlation information. The notification correlation information could be received by the S-NEF 502 and sent by the AF 501 when the AF 501 first subscribed S-NEF 502 to receive event reports of event ID(s). The new notification correlation information could be received in Step 53 of FIG. 5 when the AF 501 sent the event subscription modification request to the S-NEF 502.

According to embodiments, the message in Step 53 of FIG. 5 may be implemented by using an existing service of NEF, e.g. Nnef_EventExposure_Subscribe. The AF may send Nnef_EventExposure_Subscribe message including one or more input parameters including event ID(s), target of event reporting (GPSI or external group identifier), event reporting information which may be considered as similar to that as currently described in the standard (for example as described by a in Table 4.15.1-1 of TS 23.502), information of the new event receiving NF (e.g. the T-NEF), the event ID(s), time information, expire time, notification correlation information, new notification correlation information, subscription correlation information, new subscription correlation information and use new event receiving NF for future messages. The new notification correlation information may be a new notification correlation ID wherein the T-NEF 503 may send the new notification correlation information together with event report (or notification) to the AF 501. The AF 501 may not send the new notification correlation information to the S-NEF 502 in Step 53 of FIG. 5, which implies that the T-NEF 503 may send the (current) notification correlation information together with event report to the AF 501 when the subscribed event happens. The new subscription correlation information could be a new subscription correlation ID to be used by the T-NEF 503 when this subscription of the AF 501 in the T-NEF 503 is modified later.

In some embodiments, the S-NEF 502 may send a response in Step 56 of FIG. 5 for request received in Step 53 of FIG. 5 by using Nnef_EventExposure_Subscribe with one or more of outputs that may include new subscription correlation ID and new expiry time.

According to embodiments, the messages in Step 55*a*, 55*b* and 57*a* of FIG. 5 may be implemented by using existing services of NFs, and as such the NF 504 may be configured as a UDM, PCF, AMF, SMF, and thus use the services associated with the respective function.

According to some embodiments, the event reporting NF 504 is an AMF. As such at Step 55*a* of FIG. 5, the S-NEF 502 may use a service, e.g. Namf_EventExposure_Subscribe service, of the AMF to send to the AMF parameters related to the current event subscription by the S-NEF 502 and input parameters to modify the current event subscription. The input parameters related to the current event subscription by the S-NEF 502 may include one or more parameters including NF ID (of the S-NEF 502), target of event reporting: UE(s) ID (SUPI or internal group identifier or indication that any UE is targeted), ((set of) event ID(s) which may be described by a current communication standard, for example in Clause 5.2.2.3.1 of TS 23.502, notification target address (of the T-NEF 503), notification correlation ID, subscription correlation information, event reporting information which may be described by a current standard, for example Table 4.15.1-1 of TS 23.502. The input parameters to modify the current event subscription may be one or more parameter including information of the new event receiving NF (e.g. the T-NEF 503), the event ID(s), time information, expiry time, new subscription correlation information that the S-NEF 502 received from the T-NEF 503 in Step 54*b* of FIG. 5, new notification correlation information that the S-NEF 502 received from the T-NEF 503 in Step 54*b* of FIG. 5 and use new event receiving NF (i.e. T-NEF 503) for future messages.

At Step 55*b* of FIG. 5 the NF 504, which in this example is an AMF may use a service of the AMF, for example Namf_EventExposure_Subscribe service, to send the outputs to the S-NEF 502 which may include subscription correlation ID, expiry time and new subscription correlation information.

At Step 57*a* of FIG. 5 the NF 504, which in this example is an AMF, may use a service of the AMF, for example Namf_EventExposure_Notify service, to send event notifications to the T-NEF 503. In this message the AMF may include one or more parameters for example AMF ID (GUAMI), event ID, corresponding UE (SUPI and if available GPSI), time stamp, event specific parameter list, notification target address (of the T-NEF 503), notification correlation information, new notification correlation information, subscription correlation information and new subscription correlation information.

According to some embodiments, the event reporting NF 504 is a UDM. As such at Step 55a of FIG. 5, the S-NEF 502 may use a service of the UDM, for example Nudm_EventExposure_Subscribe, to send to the UDM parameters related to the current event subscription by the S-NEF 502 and input parameters to modify the current event subscription. The input parameters related to the current event subscription by the S-NEF 502 may be one or more parameters including notification correlation ID, subscription correlation information, target of event reporting: e.g. UE(s) ID (SUPI or GPSI, internal group identifier or external group identifier, or indication that any UE is targeted), event filter containing the event ID(s) (which may be described by a current standard, for example in Clause 4.15.3.1 of TS 23.502) and event reporting information for example as described in a current standard, for example in Table 4.15.1-1 of TS 23.502. The input parameters to modify the current event subscription may be one or more parameters including information of the new event receiving NF (e.g. T-NEF 503), the event ID(s), time information, expiry time, new notification correlation information, new subscription correlation information, and "use new event receiving NF for future messages" parameter.

At Step 55b of FIG. 5, the NF 504, which is this example is a UDM, may use a service of UDM, for example Nudm_EventExposure_Subscribe service, to send one or more of output parameters to the S-NEF 502. The operation execution result indication may be described as follows. When the subscription is accepted, the indication may include subscription correlation ID, expiry time, first corresponding event report may be included, if corresponding information is available (which may be described by a current standard, for example in Clause 4.15.1 of TS 23.502), number of UEs of the external group identifier and maximum number of reports to be included in the inputs and new subscription correlation information.

At Step 57a of FIG. 5 the NF 504, which is this example is a UDM, may use a service of the UDM, for example Nudm_EventExposure_Notify service to send event notifications to the T-NEF 503. In this service the UDM may include one or more of following parameters event ID, time stamp, event specific parameters list, notification target address (of the T-NEF 502), notification correlation information, new notification correlation information, subscription correlation information and new subscription correlation information.

According to some embodiments, the event reporting NF 504 is a PCF. As such at Step 55a of FIG. 5 the S-NEF 502 may use Npcf_EventExposure_Subscribe to send one or more parameters related to the current event subscription by the S-NEF 502 and parameters to modify the current event subscription. The input parameters related to the current event subscription by the S-NEF 502 may include one or more parameters including NF ID (of the S-NEF 502), target of event reporting (internal group identifier or indication that any UE accessing a combination of (DNN, S-NSSAI) is targeted, (set of) event ID(s) which may be described by a current standard, for example in Clause 5.2.5.7.1 of TS 23.502, notification target address (of the T-NEF 503), and event reporting information, which may be described by a current standard, for example in Table 4.15.1-1 of TS 23.502, event filter (s) associated with each event ID, information of the new event receiving NF (e.g. T-NEF 503), the event ID(s), time information, expiry time, notification correlation information and subscription correlation information. The input parameters to modify the current event subscription may include one or more parameters including information of the new event receiving NF (e.g. the T-NEF 503), the event ID(s), time information, expiry time, new subscription correlation information that the S-NEF 502 received from the T-NEF 503 in Step 54b of FIG. 5, new notification correlation information that the S-NEF 502 received from the T-NEF 503 in Step 54b of FIG. 5 and use new event receiving NF (i.e. T-NEF 503) for future messages.

At Step 55b of FIG. 5, the NF 504 which in this example is a PCF, may use Npcf_EventExposure_Subscribe service to send the one or more of output parameters including an operation execution result indication. When the subscription modification is accepted the parameters may include one or more of following parameters: subscription correlation ID, new subscription correlation ID and the first corresponding event report may be included, if the corresponding information is available (which may be described by a current standard, for example in Clause 4.15.1 of TS 23.502).

At Step 57a of FIG. 5 the NF 504, which in this example is a PCF, may use a service of the PCF, for example Npcf_EventExposure_Notify service to send event notifications to the T-NEF 503. In this service the PCF may include one or more parameters including event ID, corresponding UE ID (e.g. represented by GPSI), time stamp, notification target address (of the T-NEF 503), notification correlation information, new notification correlation information, subscription correlation information and new subscription correlation information.

According to some embodiments, the event reporting NF 504 is an SMF. As such at Step 55a of FIG. 5, the S-NEF 502 may use a service of the SMF, for example Nsmf_EventExposure_Subscribe service, to send to the SMF one or more of input parameters related to the current event subscription by the S-NEF 502 and input parameters to modify the current event subscription. The input parameters related to the current event subscription by the S-NEF 502 may be one or more of parameters including NF ID (of the S-NEF 502), target of event reporting, which may be described by a current standard, for example in Clause 5.2.8.3.1 of TS 23.502, (set of) event ID(s) which may be described by a current standard, for example in Clause 5.2.8.3.1 of TS 23.502, notification target address (of the T-NEF 503), notification correlation ID, event reporting information which may be described by a current standard, for example in Table 4.15.1-1 of TS 23.502, event filter(s) associated with each event ID, wherein event filter(s) may be configured for example as described in Clause 5.2.8.3.1 of TS 23.502, information of the new event receiving NF (e.g. T-NEF 503), the event ID(s), time information, expiry time, notification correlation information and subscription correlation information. The input parameters to modify the current event subscription may include one or more of information of the new event receiving NF (e.g. the T-NEF 503), the event ID(s), time information, expiry time, new subscription correlation information that the S-NEF 502 received from the T-NEF 503 in Step 54b of FIG. 5, new notification correlation information that the S-NEF 502 received from the T-NEF in Step 54b of FIG. 5, and use new event receiving NF (i.e. T-NEF 503) for future messages.

At Step 55b of FIG. 5, the NF 504, which in this example is a SMF, may use a service of SMF, for example Nsmf_EventExposure_Subscribe to send one or more of output parameters to the S-NEF 502, wherein these output parameters may include new subscription correlation ID, expiry time (required if the subscription may be expired based on the operator's policy), first corresponding event report may be included, if available (which may be described by a current standard, for example in Clause 4.15.1 of TS 23.502), notification target address (of T-NEF 503), notification correlation ID and new notification correlation ID which may be used to correlate notifications sent by SMF with this subscription.

At Step 57a of FIG. 5, the NF 504, which in this example is a SMF, may use a service of the SMF, for example Nsmf_EventExposure_Notify service, to send event notification to the T-NEF 503. The parameters included by the SMF may include event ID, UE ID (SUPI and if available GPSI), PDU session ID, time stamp, event specific parameter list which may be described by a current standard, for example in Clause 5.2.8.3.1 of TS 23.502, notification correlation information, new notification correlation information, subscription correlation information and new subscription correlation information.

According to embodiments, the message flow of FIG. 5 may be modified in different ways. For example, in some embodiments, the NEF may initially subscribe to the UDM to receive UE mobility information. The UDM may subscribe the AMF for UE mobility information. The UDM may instruct the AMF to send the UE mobility information to the UDM and then the UDM may send the UE mobility information to the S-NEF, or the AMF may send UE mobility information to the S-NEF directly. In this scenario, if the AF 501 sends an event subscription modification request to the S-NEF 502 at Step 53 of FIG. 5, at Step 5a of FIG. 5, the S-NEF 502 may request the event subscription modification request to the UDM, the UDM may send another message event subscription modification request to the AMF. At Step 55b of FIG. 5, the AMF may send the event subscription modification response to the UDM and then the UDM may send another event subscription modification response to the S-NEF 502.

In another example, the NEF may initially subscribe to the PCF to receive PDU session information. The PCF may subscribe the SMF for PDU session information. The PCF may instruct the SMF to send the PDU session information to the PCF and then the PCF sends PDU session information to the S-NEF. Alternatively, the PCF may instruct the SMF to send PDU session information to the S-NEF directly. In this scenario, if the AF 501 sends an event subscription modification request to the S-NEF 502 at Step 3 of FIG. 5, at Step 55a of FIG. 5, the S-NEF 502 may request the event subscription modification request to the PCF, and the PCF may send another message event subscription modification request to the SMF. At Step 55b of FIG. 5, the SMF may send an event subscription modification response to the PCF, then the PCF may send another event subscription modification response to the S-NEF 502.

According to embodiments, during the execution of the method described in FIG. 4 or the method described in FIG. 5, both the S-NEF 502 and T-NEF 503 may receive the same event notification sent from the NF that produces the event notifications. Either or both the S-NEF 502 and T-NEF 503 may send this event notification to the AF 501. The AF 501 may receive two event notifications for the same event. The AF 501 may use the time stamp carried in the event notifications to know that the two event notifications are exactly the same. The AF 501 may discard the event notification sent by the S-NEF 502. The AF 501 may communicate with the T-NEF 503 to send responses regarding the received event notification from the T-NEF 503.

Figure 6:
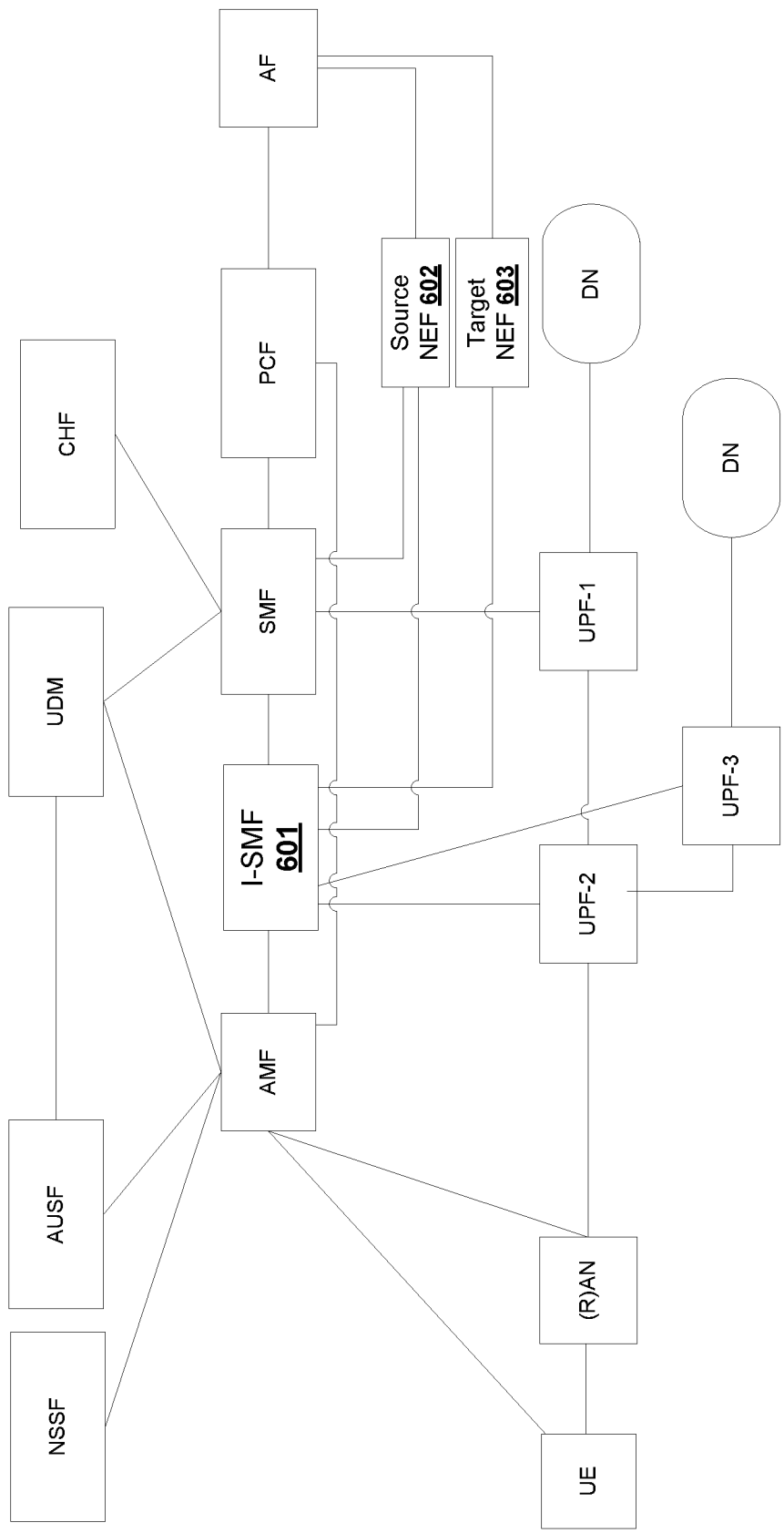
FIG. 6 illustrates an example network architecture featuring an intermediate session management function (I-SMF), in accordance with embodiments.

According to some embodiments, the network configuration may include an intermediate SMF (I-SMF). In some scenarios, an intermediate SMF (I-SMF) may be required to support an SMF controlling a user plane function (UPF). For example, in FIG. 6, the SMF, source NEF 602 (S-NEF), UPF-1 are configured to support data connection of a UE with a data network (DN). When UE moves to a new location outside service area of the SMF, the AMF may select an I-SMF 601 to support the SMF controlling the UPF-2 and UPF-3. The connection between the SMF and S-NEF may provide satisfactory quality of service (QoS) for event reports sent to the AF. However, the connection between the I-SMF and S-NEF may or may not provide satisfactory quality of service (QoS) for event reports sent to the AF. If the QoS of the connection between the I-SMF and S-NEF, or the connection between the I-SMF-SMF-S-NEF does not meet the QoS requirements, it may be necessary to find better connections to meet the QoS requirements.

For example, when the I-SMF is added, the I-SMF is the event reporting NF. The I-SMF may send some event reports to the SMF and the SMF may forward the event reports to the AF via S-NEF. Since the SMF is a relay, the SMF may cause additional packet (or message) transfer delay. This embodiment provides a solution to allow the I-SMF 601 to report the events directly to the S-NEF 602 or T-NEF 603 to reduce the message or packet transfer delay.

In some embodiments, when one or more events may be reported to the SMF, the SMF may send a subscription message to the I-SMF with the notification target address is set to the address of the S-NEF. When an event occurs, such as the QoS monitoring report (e.g. for uplink (UL) or downlink (DL), or round trip time packet delay measurements) received from the UPF-2 or UPF-3, the I-SMF may send the QoS report to the S-NEF.

In some embodiments, the AF may trigger the NEF re-selection as described in earlier embodiments. The AF may re-select T-NEF to receive the event notifications for the UE and PDU Session related event ID(s) to the AF.

In some embodiments, a NF such as the I-SMF, SMF, or PCF, may trigger the re-selection of the NEF so that the T-NEF may be selected to transfer the UE and/or PDU session related event ID(s) to the AF.

Figure 7:
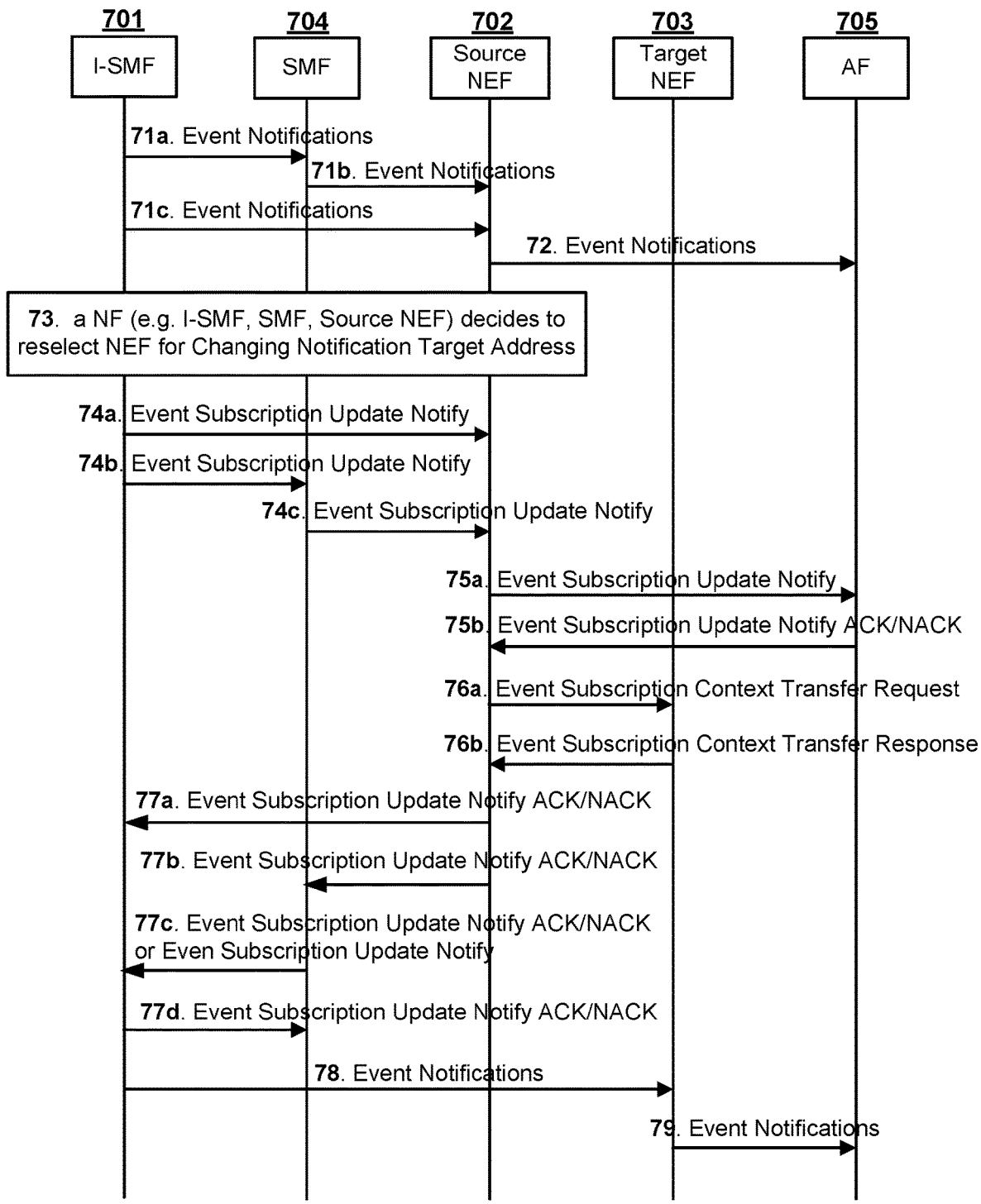
FIG. 7 illustrates a method for reselection of a NEF when an intermediate session management function (I-SMF) is present in the network architecture, in accordance with embodiments.

According to some embodiments, a method to support NEF reselection when an I-SMF is used is shown in FIG. 7. In FIG. 7, the SMF 704 or I-SMF 701 or in some instances the S-NEF 702 may determine whether the S-NEF 702 may be reselected. These embodiments can provide a means for reducing communication network latency during reselection of a NEF, for example transferring from a S-NEF to a T-NEF, by providing an intermediate SMF for provision of multiple actions.

At Step 71a of FIG. 7, the I-SMF 701 may send event notifications to SMF 704. The event notifications could be sent by using a service of the SMF 704, for example Nsmf_EventExposure_Notify service.

At Step 71b of FIG. 7, the SMF 704 may receive an event notification from the I-SMF 701. The SMF 704 may send this event notification to the S-NEF 702. The event notifications could be sent by using a service of the SMF, for example Nsmf_EventExposure_Notify service. According to some embodiments, Step 71c of FIG. 7 may be skipped because the event notification is sent from the I-SMF 701 to the SMF 704, instead of the S-NEF 702.

At Step 71c of FIG. 7, if the I-SMF 701 has been configured, for example by the SMF 704, to send event notifications to the S-NEF 702, the I-SMF 701 may send event notifications to the S-NEF 702 directly.

At Step 72 of FIG. 7, the S-NEF 702 forwards the received event notifications to the AF 705.

The S-NEF 702 may use a service of the S-NEF 702, for example Nnef_EventExposure_Notify service, to send the event notifications to the subscribed AF 705, or other NFs.

At Step 73 of FIG. 7, the I-SMF 701, or SMF 704, or the S-NEF 702 itself may decide to re-select another NEF (e.g. target NEF (T-NEF)) to which event notifications are to be sent to. The cause of the trigger for NEF reselection may include one or more factors load balancing, overcoming DoS attacks, and to reduce message transfer delay from the I-SMF 701 to the AF 705. The I-SMF 701 or SMF 704 may know the current UE location. If the UE location is outside of service area, or outside core service area, or outside the extended service area of the S-NEF 702, the I-SMF 701 or SMF 704 may decide to reselect another NEF to send event notifications to the AF 705. The I-SMF 701, or SMF 702 may use one or more of the following additional pieces of information to decide the reselection of the NEF which may include the UE mobility information and packet delay requirements.

At Step 74*a* of FIG. 7, if the S-NEF 702 has subscribed or requested to receive event notifications from the SMF, and for these events, the SMF 704 has subscribed to receive theses event notifications (subscribed or requested by the S-NEF 702) from the I-SMF 701, the I-SMF 701 may send an event subscription update notify message to the S-NEF 702 to notify the S-NEF 702 about the T-NEF 703, which could provide better QoS connection, e.g. with lower packet delay, between the I-SMF 701 and the T-NEF 703 or AF 705. An event subscription update notify or notification can be indicative of a change of destination for subsequent event notifications. For example a destination can be considered to be a UE, or application function (AF) or a network function that is configured to receive the event notifications. The message may include the information of the T-NEF 703, for example one or more of network function profile of the T-NEF 703, address of the T-NEF 703 (e.g. IP address(es), FQDN, endpoint address). The I-SMF 701 may use a service of I-SMF 701 to send the event subscription update notify message to the S-NEF 702. In some embodiments step 74*b* and 74*c* of FIG. 7 may be skipped as there may not be necessary for the I-SMF 701 to notify the SMF 704 about T-NEF 703 for reselection of NEF.

At Step 74*b* of FIG. 7, if the S-NEF 702 has subscribed or requested to receive event notifications from the SMF 704, and for these events, the SMF 704 has subscribed to receive theses event notifications (subscribed or requested by the S-NEF 702) from the I-SMF 701, the I-SMF 701 may send an event subscription update notify message to the SMF 704 to notify the SMF 704 about the T-NEF 703, which could provide better QoS connection, for example with lower packet delay, between the I-SMF 701 and the T-NEF 703 or AF 705. The message may include the information of the T-NEF 703, for example one or more of network function profile of the T-NEF 703, address of the T-NEF 703 (e.g. IP address(es), FQDN, endpoint address). The I-SMF 701 may use a service of I-SMF 701 to send the event subscription update notify message to the SMF 704.

At Step 74*c* of FIG. 7, if the SMF 704 received the message from the I-SMF 701 in Step 74*b* of FIG. 7, or the SMF 704 decides to reselect a new NEF to send subscribed or requested event notifications of one or more event IDs to the S-NEF 702, the SMF 704 may send an event subscription update notify message to the S-NEF 702. The message may include the information of T-NEF 703 that the SMF 704 received from the I-SMF 701, or the information of T-NEF 703 that is known by the SMF 704. The information of T-NEF 703 may include information including one or more of network function profile of the T-NEF 703, address of the T-NEF 703 (e.g. IP address(es), FQDN, endpoint address). The SMF 704 may use a service of SMF 704 to send the event subscription update notify message to the S-NEF 702.

At Step 75*a* of FIG. 7, after receiving the event subscription update notify from the I-SMF 701 or SMF 704, the S-NEF 702 may send to the AF 705 an event subscription update notify message to notify the AF 705 about the information of the T-NEF 703 which could be used in the future to send the event notifications to the AF 705. The message may include an indication to update the existing subscription of the AF 705 and an indication to update the NEF, which is T-NEF 703 that will send the event notifications to the AF 705, and the information of the AF 705. The information of the T-NEF 703 may be one or more information the S-NEF 702 received from the SMF 704 or I-SMF 701, for example the NF profile of the T-NEF 703, the address of the T-NEF 703 (for example IP address(es), IP prefix(es), FQDN, endpoint address), NF ID of the T-NEF 703.

At Step 75*b* of FIG. 7, the AF 705 may decide whether or not to use the new T-NEF 703.

If the AF 705 decides to use the new T-NEF 703, the AF 705 may store the information of T-NEF 703 received from the S-NEF 702 in a storage medium. The AF 705 may use the T-NEF 703 to send modification request or un-subscription request related to the event subscription that has been subscribed by the AF 705 in the S-NEF 702. Alternatively, the AF 705 may continue communicating with the S-NEF 702 to send modification request or un-subscription request related to the event subscription that has been subscribed by the AF 705 in the S-NEF 702. The AF 705 may send an event subscription update notify ACK (acknowledgment) to the S-NEF 702 to confirm that the AF 705 will receive the event notifications from the T-NEF 703. The event subscription update notify ACK may include an indication that the AF 705 shall communicate with the T-NEF 703 for exchanging the messages related to the subscribe event ID(s). An event subscription update notification ACK can be indicative of acceptance of the change of destination for subsequent event notifications.

The event subscription update notify ACK message may include information of another NEF that the AF 705 may want to communicate with regarding the subscribed event ID(s). The information of the new NEF may be one or more of address of the NEF (IP address(es), IP prefix(es), endpoint address(es), FQDN), port number of the NEF, NEF ID and NEF profile.

The event subscription update notify ACK message may include information of another AF (target AF or T-AF) that may communicate with the mobile network regarding the subscribed event ID(s). The information of T-AF may be one or more of following information address of the AF (IP address(es), IP prefix(es), endpoint address(es), FQDN), port number of the AF, AF ID, AF-Service-ID, AF profile.

If the AF 705 decides to continue receiving the event notifications from the S-NEF 702, the AF 705 may send an event subscription update notification NACK (negative acknowledgment) message to the S-NEF 702. The message may include an indication that the AF reject the request to update the NEF information sent from the S-NEF 702 in Step 75*a* of FIG. 7. Step 76*a* and 76*b* of FIG. 7 may be skipped, which means that the S-NEF 702 shall not transfer the event subscription information to the T-NEF 703.

At Step 76*a* of FIG. 7, if the S-NEF 702 received the event subscription update notify ACK in step 75*b*, the S-NEF may send an event subscription context transfer request to the T-NEF 703. The message may contain some or all the information related to the event subscription of the AF 705, which may be a combination of one or more of (1) information received from the AF when the AF sent the subscription request to the S-NEF (e.g. AF ID, AF-service-ID, address of the AF (e.g. IP address(es), IP prefix(es), FQDN, endpoint address)), event ID(s), target of event reporting (e.g GPSI(s) of the UE(s), external group identifier), event reporting information, notification target address (and notification correlation ID), event filter, subscription correlation ID, expire time; (2) the subscription information related to the subscription of the S-NEF 702 to one or more NF (e.g. AMF, SMF, UDM, PCF, NWDAF) in order to receive event notifications that subscribed by the AF 705.

The S-NEF 702 may include an indication indicating that the AF 705 (or T-AF) shall communicate with the T-NEF 703 regarding the subscribed notifications for event ID(s). The S-NEF 702 may not communicate with the AF 705 after receiving that indication from the S-NEF 702.

At Step 76b of FIG. 7, the T-NEF 703 may send an event subscription context transfer response to the S-NEF 702 to confirm the reception of the information sent by the S-NEF in Step 76a of FIG. 7.

At Step 77a of FIG. 7, if the S-NEF 702 received the message from the I-SMF 701 in Step 74a of FIG. 7, depending on the message in Step 75b of FIG. 7 including ACK or NACK indication, the S-NEF 702 may send to the I-SMF 701 a message, for example an event subscription update notify ACK or NACK, respectively, in Step 77a of FIG. 7 to confirm that event subscription update notify message to notify the SMF 704 that the event notifications that were subscribed by the S-NEF 702 will be sent to the T-NEF 703 or not, respectively.

If the S-NEF 702 received event subscription update notify NACK in Step 75b of FIG. 7, and the S-NEF 702 received from the I-SMF 701 the message in Step 74a of FIG. 7, the S-NEF 702 may send to the I-SMF 701 an event subscription update notify NACK in Step 77a of FIG. 7 to confirm that the I-SMF 701 shall send event notifications for the subscribed event ID(s) to the S-NEF 702. This message is to reject the event subscription update notify message sent in Step 74a of FIG. 7. The I-SMF 701 shall send the event notifications for the subscribed event ID(s) to the S-NEF, and the I-SMF shall not send the event notifications for the subscribed event ID(s) to the T-NEF.

The S-NEF 702 may use a service of the SMF, for example Nsmf_EventExposure_Notify service, to send the message in Step 77a of FIG. 7. The message may include either acknowledgment (ACK) indication or negative acknowledgment (NACK) indication, corresponding to the ACK or NACK the S-NEF 702 received in Step 75b of FIG. 7. If the ACK indication is included, the message may include one or more of following information, "new notification target address" of the T-NEF 703, an indication or parameter "use new notification target address for future messages" to confirm that the new notification target address of the T-NEF 703 will communicate with the SMF in the future regarding the subscribed event notifications.

At Step 77b of FIG. 7, if the S-NEF 702 received event subscription update notify ACK in Step 75b of FIG. 7, and the S-NEF 702 received from the SMF 704 a message in Step 74c of FIG. 7, the S-NEF 702 may send to the SMF 704 an event subscription update notify ACK in Step 77b of FIG. 7 to confirm that the event subscription update notify message in step 74c is accepted. The event notifications for the subscribed event ID(s) shall be sent to the T-NEF 703. The I-SMF 701 may send the event notifications to the T-NEF 703.

If the S-NEF 702 received event subscription update notify NACK in Step 75b of FIG. 7, and the S-NEF 702 received from the SMF 704 a message in Step 74c of FIG. 7, the S-NEF 702 may send to the SMF 704 a message event subscription update notify NACK to confirm the event subscription update notify message in Step 74c of FIG. 7 is rejected. The event notifications from the I-SMF 701 for the subscribed event ID(s) shall be sent to the S-NEF 702, not the T-NEF 703.

In the message event subscription update notify ACK sent in Step 77a or 77b of FIG. 7, the S-NEF 702 may include an indication that the I-SMF 701 or SMF 704 shall communicate with the T-NEF 703 (not the S-NEF 702) regarding the subscribed event ID(s).

After Step 77a or 77b of FIG. 7, if the S-NEF 702 received in Step 75b of FIG. 7 an indication that the AF 705 will communicate with the T-NEF 703 regarding subscribed event ID(s), the S-NEF 702 may release or delete all the context information related to this subscribed event ID(s). In some embodiments, the S-NEF 702 may not receive in Step 75b of FIG. 7 an indication that the AF 705 will communicate with the T-NEF 703 regarding subscribed event ID(s), the S-NEF 702 may release or delete all the context information related to this subscribed event ID(s). The I-SMF 701 or SMF 704 may communicate with the T-NEF 703 regarding the subscribed event ID(s), e.g. to modify or unsubscribe the subscription for the subscribed event ID(s).

At Step 77c of FIG. 7, if the SMF 704 received from the S-NEF 702 the event subscription update notify ACK in Step 77b of FIG. 7, the SMF 704 may send to the I-SMF 701 an event subscription update notify ACK. The message may confirm that the event subscription update notify in Step 74a of FIG. 7 or in Step 74b of FIG. 7 is accepted. The I-SMF 701 may send event notifications for the subscribed event ID(s) to the T-NEF 703.

If the SMF 704 received from the S-NEF 702 the event subscription update notify NACK in Step 77b of FIG. 7, the SMF 704 may send to the I-SMF 701 an event subscription update notify NACK. The message confirms that the event subscription update notify in Step 74a or 74b of FIG. 7 is rejected. The I-SMF 701 may continue sending event notifications for the subscribed event ID(s) to the S-NEF 702.

At Step 78 of FIG. 7, if the event subscription update notify ACK was received in Step 77a or 77c of FIG. 7, the I-SMF 701 may send the event notifications for the subscribed event ID(s) to the T-NEF 703. Otherwise, if the event subscription update notify NACK was received in Step 77a or 77c of FIG. 7, the I-SMF 701 may send the event notifications for the subscribed event ID(s) to the S-NEF 702.

At Step 79 of FIG. 7, if the T-NEF 703 received the event notifications of subscribed event ID(s), the T-NEF 703 may send the event notifications to the AF 705 or the T-AF.

Figure 8:
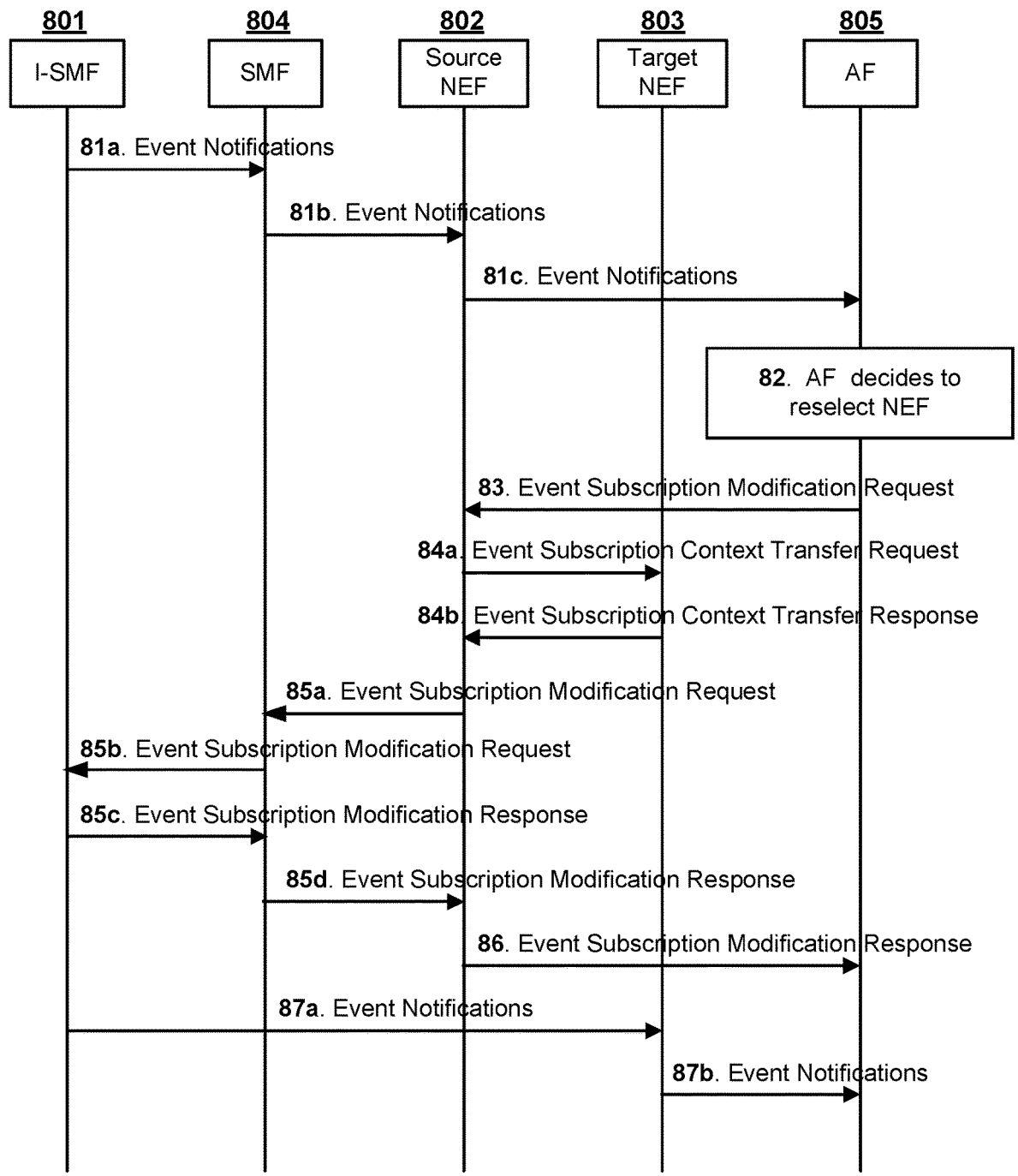
FIG. 8 illustrates a method for reselection of a NEF when an intermediate session management function (I-SMF) is present in the network architecture, according to embodiments.

According to embodiments, FIG. 8 illustrates another method to support NEF reselection when an I-SMF is used. In FIG. 8, the AF 805 may identify whether the S-NEF 802 could be reselected. These embodiments can provide a means for reduction of communication with an AF during reselection of a NEF, for example transferring from a S-NEF to a T-NEF.

At Step 81a of FIG. 8, the I-SMF 801 reports event notifications to the SMF 804. The message may include an indication to inform (or request) the SMF 804 to reselect the NEF. For example, the message may include the UE location, such as cell ID that serves the UE. The UE location may be outside the service area, or outside the core service area, or outside the extended service area of the S-NEF 802.

At Step 81b of FIG. 8, the SMF 804 may forward the message received in Step 1a of FIG. 8 to the Source NEF 802 (S-NEF).

At Step 81c of FIG. 8, the S-NEF 802 may send the event notification to the AF 805, the message may include an indication to inform (or request) the AF 805 to re-select the NEF.

At Step 82 of FIG. 8, the AF 805 may decide to re-select another NEF. The cause for a decision regarding reselection may be that the AF 805 received in Step 81c of FIG. 8 an indication from the S-NEF 802 to request re-selection of the NEF. Another cause for a decision regarding reselection may be that the AF 805 receives a location information of the UE that moves to a new location, that could be outside the service area, or outside the core service area, or outside the extended service area of the S-NEF 802. The AF 805 may use UE mobility information to decide whether a new NEF may be selected. The AF 805 may discover new NEF(s) by using a service of NRF. The NRF may provide the AF 805 with one or more NF profiles of NEF instances, or NEF service instances. The AF 805 may select one of the NEFs from the received information provided by the NRF. Another method to discover NEF is to use configuration information regarding NEFs stored in the AF 805. After receiving the NEF NF profile(s) from the NRF, the AF 805 may use information including one or more of UE location, UE mobility information and NEF profile in order to select and NEF.

The AF 805 may select or re-select an NEF at any time, for example during a handover procedure where the UE is being handed over from one serving radio node to another radio node or any time when the UE is not in the handover procedure.

At Step 83 of FIG. 8, the AF 805 may send a message event subscription modification request to the S-NEF 802. The message may contain information of the new event receiving NF (e.g. the T-NEF 803), the event ID(s), time information, expire time, notification correlation information, subscription correlation information, new notification correlation information and use new event receiving NF for future messages. An event subscription modification request can be indicative of a change of destination for subsequent event notifications. For example the destination can be considered to be a UE, or application function (AF) or a network function that is configured to receive the event notifications.

The information of the T-NEF may include one or more parameters including the address of the T-NEF and the NF ID of the T-NEF. The event ID(s) of the event notification subscription to be modified. The time information to indicate the time the modification may take place, "expire time" to indicate when the new subscription to the T-NEF may expire. The notification correlation information could be notification correlation ID, which has been provided by the AF 805 to the S-NEF 802 so that the S-NEF 802 could identify the subscription information of the AF related to the event ID(s). The subscription correlation information (e.g. subscription correlation ID) has been generated by the S-NEF 802 when the S-NEF 802 received the event notification subscription for the event ID(s) from the AF 805. The subscription correlation information may be used by the S-NEF 802 to identify the subscription information in the S-NEF 802 related to the subscribed event ID(s). The new notification correlation information (for example new notification correlation ID) is the information generated by the AF 805 so that the NEF and AF 805 may use to identify the subscription of the AF for the event ID(s). The parameter "use new event receiving NF for future messages" may be included for the AF 805 to request that the T-NEF 803 shall communicate with the AF 805 regarding the subscribed event ID(s); the S-NEF 802 may release all the information related to the event ID(s) and may not communicate with the AF 805 regarding the subscription of event ID(s) after reselection and transfer has been completed.

The AF may subscribe, e.g. 10 Event IDs, to the S-NEF. The AF may send event subscription modification request for some, e.g. 2 event ID(s), of the subscribed event ID(s).

At Step 84a of FIG. 8, the S-NEF 802 may transfer one or more of received information related to the event ID(s) to the T-NEF 803 as requested by the AF 805 in Step 83 of FIG. 8 to the SMF 804. The S-NEF 802 may send a message, e.g. an event subscription context transfer request, to the T-NEF 803 to transfer the event subscription information to the T-NEF 803. The message may contain all the information related to the event subscription of the AF 805, which may be any combination of the following parameters: (1) one or more information received from the AF 805 when the AF 805 first sent the subscription request to the S-NEF 802 (e.g. AF ID, AF-service-ID, address of the AF (e.g. IP address(es), IP prefix(es), FQDN, endpoint address)), event ID(s), target of event reporting (e.g GPSI(s) of the UE(s), external group identifier), event reporting information, notification target address (e.g. the address of the AF), notification correlation ID (e.g. the new notification correlation ID the S-NEF 802 received in Step 83 of FIG. 8 from the AF 805), event filter, subscription correlation ID (which was generated by the S-NEF corresponding to the AF subscription for an event ID), expire time; (2) one or more information received from the AF sent in the message at Step 83 of FIG. 8; (3) the subscription information related to the subscription of the S-NEF to the SMF in order to receive event report (or notification) that subscribed by the AF. The subscription information related to event subscription to SMF may include one or more of following information: SMF ID, S-NEF ID, target of event reporting, (set of) event ID(s), notification target address (which is the address of S-NEF), and notification correlation ID (which could have been generated by the S-NEF when the S-NEF subscribed SMF for the event report (or event notification)), event reporting information, event filter(s) associated with each event ID; event filter(s), subscription correlation ID (which could has been generated by the S-NEF when the S-NEF first subscribed SMF for the evet report (or event notification) in case of modification of the event subscription), Expiry time. An event subscription context transfer request can be indicative of a request to transfer context information associated at least in part with the UE.

Target of event reporting may be described by a current standard, for example in Clause 5.2.8.3.1 of TS 23.502. Event filter(s) may be described by a current standard, for example in Clause 5.2.8.3.1 of TS 23.502.

The S-NEF 802 may include an indication indicating that the AF 805 (or T-AF) shall communicate with the T-NEF 803 regarding the subscribed notifications for event ID(s). The S-NEF 802 may not communicate with the AF 805 after receiving this indication from the S-NEF 802.

At Step 84b of FIG. 8, the T-NEF 803 may send event subscription context transfer response to the S-NEF 802. This message may be similar to the message in Step 46b of FIG. 4. The T-NEF 803 may include one or more of following information: T-NEF ID, notification target address (which is the address of T-NEF), notification correlation ID (which is generated by the T-NEF), subscription correlation ID (which is generated by the T-NEF in case of modification of the event subscription).

At Step 85*a* of FIG. 8, the S-NEF 802 may send a message, e.g. event subscription modification request, to the SMF 804 to modify the subscription information of one or more previously subscribed event ID(s). The message may include one or more of following information: information of the new event receiving NF (e.g. T-NEF 803), the event ID(s), time information, expire time, notification Correlation information (that the S-NEF generated when the S-NEF subscribed to for event notification of the SMF), subscription correlation information (that the S-NEF generated when the S-NEF subscribed to for event notification of the SMF), new notification correlation information (which is notification correlation information that the S-NEF 802 received from the T-NEF 803, generated by the T-NEF, in Step 84*b* of FIG. 8), new subscription correlation information (which is the subscription correlation information that the S-NEF received from the T-NEF 803 in Step 84*b* of FIG. 8) and "use new event receiving NF for future messages" parameter.

The information of the T-NEF 803 may include one or more of following parameters: the address of the T-NEF, the NF ID of the T-NEF. The event ID(s) of the event notification subscription to be modified. The time information to indicate the time the subscription modification may take place, "expire time" to indicate when the new subscription of the T-NEF may expire. The notification correlation information could be notification correlation ID, which has been provided by the S-NEF to the event reporting NF when the S-NEF subscribed to the event ID(s) so that the event reporting NF could identify the subscription information of the S-NEF related to the event ID(s). The subscription correlation information (e.g. subscription correlation ID) has been generated by the S-NEF when the S-NEF first subscribed SMF for the event report (notification) of event ID(s) of SMF. The subscription correlation Information may be used by the SMF and S-NEF to identify the subscription information in the S-NEF related to the subscribed event ID(s). The new notification correlation information (e.g. new notification correlation ID) is the information generated by the S-NEF or the T-NEF so that the S-NEF, T-NEF and SMF may use to identify the subscription of the T-NEF for the event ID(s) of the SMF. The parameter "use new event receiving NF for future messages" may be included for the S-NEF to request that the SMF shall communicate with the T-NEF regarding the subscribed event ID(s); the S-NEF may release all the information related to the event ID(s) and may not communicate with the event reporting NF regarding the subscription of event ID(s).

At Step 85*b* of FIG. 8, the SMF 804 may send a message, e.g. event subscription modification request, to the I-SMF 801 to modify one or more existing subscriptions in the I-SMF 801 so that the I-SMF 801 will send event notifications to the T-NEF 803. The message may include one or more of following information: T-NEF ID, target of event reporting, (set of) event ID(s), notification target address (which may be the address of T-NEF), notification correlation ID (which could be the notification correlation ID generated by the SMF when the SMF subscribed to receive event notifications of the I-SMF), event reporting information, event filter(s) associated with each event ID; event filter(s), subscription correlation ID (which may be the subscription correlation ID that generated by the SMF when the SMF subscribed to receive event notifications of the I-SMF) and expiry time.

The messages sent in Steps 85*a* and 85*b* of FIG. 8 may be implemented by using a service of the SMF, for example Nsmf_EventExposure_Subscribe.

At Step 85*c* of FIG. 8, the I-SMF 801 may send a message, for example event subscription modification response, to the SMF 804. The message may include subscription correlation ID (which was provided by the SMF when the SMF subscribed to receive event notifications of the I-SMF, or provided by the SMF in step 85*b*), expiry time, one or more event report (or event notification) is included, if available.

At Step 85*d* of FIG. 8, the SMF 804 may send to the S-NEF 802 a message, e.g. event subscription modification response. The message may include one or more of following information: subscription correlation information (which may be the subscription correlation ID provided by the S-NEF and generated by the S-NEF when the S-NEF first subscribed the SMF for event notifications of event ID), new subscription correlation information (which may be the subscription correlation ID generated by the T-NEF, and was included in the message sent in Step 85*a* of FIG. 8), one or more event report (or event notification) if the SMF received from the I-SMF in Step 85*c* of FIG. 8.

At Step 86 of FIG. 8, the S-NEF 802 may send an event subscription modification response to the AF 805. An event subscription modification response can be indicative of acceptance or decline of the change of destination for subsequent event notifications. The message may include one or more of following information: notification correlation information (which has been provided by the AF to the S-NEF when the AF first subscribed to receive event notification from the S-NEF), one or more event report (or event notification) if the S-NEF 802 received from the SMF 804 in Step 85*d* of FIG. 8, subscription correlation information (which has been provided by the AF to the S-NEF when the AF first subscribed to receive event notification from the S-NEF), new subscription correlation information (which has been provided by the AF 805 to the S-NEF 802 when the AF modify the event subscription of the S-NEF 802 in Step 83 of FIG. 8), time information, new notification correlation information (which could be the new notification correlation information the S-NEF 802 received from the AF 805 in Step 83 of FIG. 8), the time information may indicate the time when the T-NEF 803 may start sending event notification to the AF 805, or the time the S-NEF 802 may stop sending event notifications for the event ID to the AF 805.

At Step 87*a* of FIG. 8, the I-SMF 801 may send event notifications to the T-NEF 803. The message may include one or more of following information to the T-NEF: one or more event report (or event notifications) for the event ID(s), notification correlation information, new notification correlation information.

The notification correlation information may be generated by the S-NEF when the S-NEF first subscribed to receive the event notification(s) service of the SMF and fulfilled the by the I-SMF.

The new notification correlation Information may be generated by the T-NEF and the T-NEF may send the new notification correlation Information in the event subscription modification request in Step 85*a* of FIG. 8.

At Step 87*b* of FIG. 8, the T-NEF 803 may forward the event notification received from the event reporting NF in step 7*a* by using a service of the T-NEF, e.g. Nnef_EventExposure_Notify service. The message may include one or more of following information: event ID, time stamp, notification correlation information, new notification correlation information, event information (or event report). The notification correlation information could be notification correlation ID received by the S-NEF 802 and sent by the AF 805 when the AF 805 first sent the event subscription message to the S-NEF 802. The new notification correlation information could be a new notification correlation ID received in Step 83 of FIG. 8 when the AF 805 sent the event subscription modification request to the S-NEF 802.

The message in Step 83 of FIG. 8 may be implemented by using an existing service of NEF, e.g. Nnef_EventExposure_Subscribe. The AF may send Nnef_EventExposure_Subscribe message include one or more of following input parameters: event ID(s), target of event reporting (GPSI or external group identifier), event reporting information which may be described by a current standard, for example in Table 4.15.1-1 of TS 23.502, information of the new event receiving NF (e.g. the T-NEF), the event ID(s), time information, expire time, notification target address (which could be the AF address), notification correlation information (such as the current notification correlation ID that the AF provided to the S-NEF when the AF first subscribed to receive event notification (or event report)), new notification correlation information (such as a new notification correlation ID that the AF provides to the S-NEF when the AF want to modify the current event notification subscription to receive the event notification from the T-NEF), subscription correlation information (such as the current notification correlation ID that the AF provided to the S-NEF when the AF first subscribed to receive event notification (or event report)), new subscription correlation information (such as a new subscription correlation ID that the AF provides to the S-NEF when the AF want to modify the current event notification subscription to receive the event notification from the T-NEF) and "use new event receiving NF for future messages" parameter.

The S-NEF may send a response in Step 86 of FIG. 8 for request received in Step 83 of FIG. 8 by using Nnef_EventExposure_Subscribe with one or more of outputs: subscription correlation ID, new subscription correlation ID, expiry time, and one or more corresponding event report, if the S-NEF available received from the SMF or I-SMF.

The message in Step 85*a* and 85*b* of FIG. 8 may be implemented by using existing services of SMF.

At Step 85*a* of FIG. 8, the S-NEF may use Nsmf_EventExposure_Subscribe to send one or more of input parameters to the SMF which may include one or more of: NF ID of the S-NEF, information of the new event receiving NF (e.g. T-NEF), (set of) event ID(s), event reporting information, target of event reporting, notification target address (e.g. the address of the T-NEF), event filter(s) associated with each event ID, time information, expire time, notification correlation information (e.g. the notification correlation ID that the S-NEF generated when the S-NEF subscribed to for event notification of the SMF), subscription correlation information (e.g. the subscription correlation that the S-NEF generated when the S-NEF subscribed the SMF for event notification of the SMF), new notification correlation information (which is notification correlation information that the S-NEF received from the T-NEF, generated by the T-NEF, in Step 84*b* of FIG. 8), new subscription correlation information (e.g. the subscription correlation ID that that the S-NEF received from the T-NEF in step 84*b*) and "use new event receiving NF for future messages" parameter.

The information of the T-NEF provided in the message at step 84*b* of FIG. 8 may include one or more of following parameters: the address of the T-NEF, the NF ID of the T-NEF. The event ID(s) of the event notification subscription to be modified. The time information to indicate the time the subscription modification may take place, "expire time" to indicate when the new subscription of the T-NEF may expire. The notification correlation information could be notification correlation ID, which has been provided by the S-NEF to the event reporting NF when the S-NEF subscribed to the event ID(s) so that the event reporting NF could identify the subscription information of the S-NEF related to the event ID(s). The subscription correlation Information (e.g. subscription correlation ID) has been generated by the S-NEF when the S-NEF subscribed the event notification for the event ID(s) of SMF. The subscription correlation information may be used by the SMF to identify the subscription information in the S-NEF related to the subscribed event ID(s). The new notification correlation information (e.g. new notification correlation ID) is the information generated by the S-NEF or the T-NEF so that the S-NEF, T-NEF and SMF may use to identify the subscription of the T-NEF for the event ID(s) of the SMF. The parameter "use new event receiving NF for future messages" may be included for the S-NEF to request that the SMF shall communicate with the T-NEF regarding the subscribed event ID(s); the S-NEF may release all the information related to the event ID(s) and may not communicate with the event reporting NF regarding the subscription of event ID(s).

At Step 85*d* of FIG. 8, the SMF may use a service of SMF, for example Nsmf_EventExposure_Subscribe service, to send one or more of output parameters to the S-NEF which may include one or more of: subscription correlation ID (which was generated and provided by the S-NEF), new subscription correlation ID (which was generated by the T-NEF, and provided to the SMF in Step 85*a* of FIG. 8 via S-NEF), expiry time (required if the subscription may be expired based on the operator's policy), corresponding event report if the SMF received from event reporting function (e.g. the I-SMF), notification target address (of T-NEF), notification correlation ID (which is used to correlate event report (or event notification) sent by SMF with this subscription), new notification correlation ID (which is used to correlate event report (event notifications) sent by SMF with this subscription).

At Step 85*b* of FIG. 8, the SMF may use a service of I-SMF, for example Nsmf_EventExposure_Subscribe service, to send event subscription modification request to the I-SMF to modify one or more existing subscriptions in the I-SMF so that the I-SMF will send event notifications to the T-NEF. The message may include one or more of following information: T-NEF ID, target of event reporting, (set of) event ID(s), notification target address (which may be the address of T-NEF), notification correlation ID (which could be the notification correlation ID generated by the SMF when the SMF subscribed to receive event notifications of the I-SMF), event reporting information, event filter(s) associated with each event ID; event filter(s), subscription correlation ID (which may be the subscription correlation ID that generated by the SMF when the SMF subscribed to receive event notifications of the I-SMF) and expiry time.

At Step 85*c* of FIG. 8, the I-SMF may use a service of I-SMF, for example Nsmf_EventExposure_Subscribe service, to send the event subscription modification response to the SMF. The message may include subscription correlation ID (which was provided by the SMF when the SMF subscribed to receive event notifications of the I-SMF, or provided by the SMF in Step 85*b* of FIG. 8), expiry time and one or more event report (or event notification) is included, if available.

At Step 87*a* of FIG. 8, the I-SMF may use a service of the SMF, e.g. Nsmf_EventExposure_Notify service, to send event notification to the T-NEF. The I-SMF may include event ID, UE ID (SUPI, and if available GPSI), PDU session ID, time stamp, event specific parameter list which may be described by a current standard, for example in Clause 5.2.8.3.1 of TS 23.502, notification target address (which could be the address of T-NEF), notification correlation information (which has been generated and provided by the S-NEF), new notification correlation information (which may be notification correlation ID generated and provided by the T-NEF), subscription correlation information (which was generated and provided by the S-NEF), new subscription correlation information (which may be subscription correlation ID generated and provided by the T-NEF).

Figure 9:
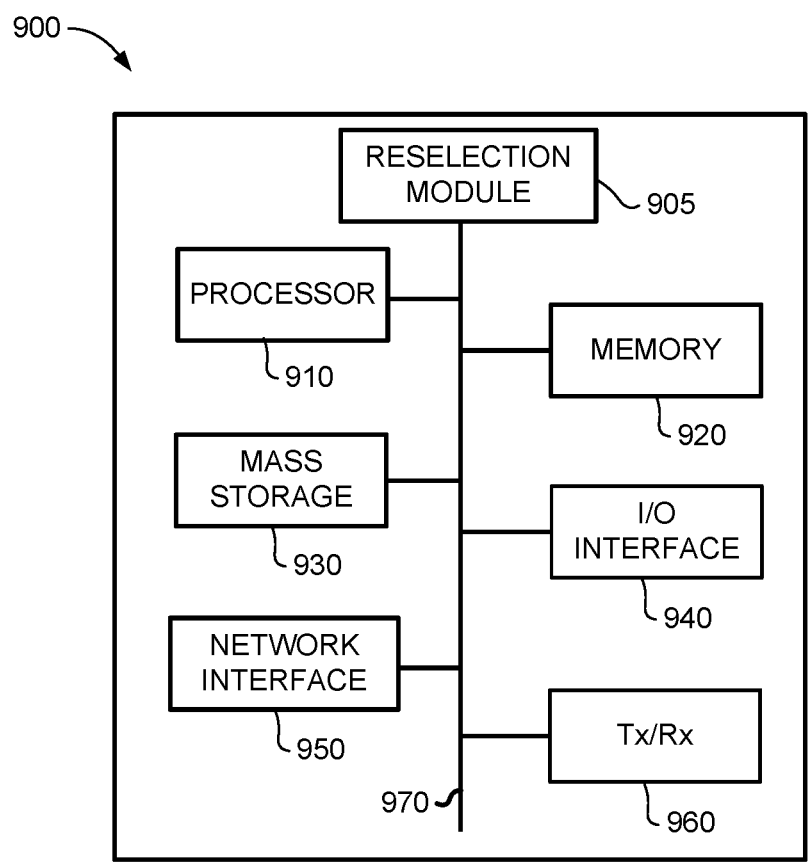
FIG. 9 illustrates, in a schematic diagram, an electronic device in accordance with embodiments.

Referring now to FIG. 9, a schematic diagram is presented of an electronic device 900 that may perform any or all of operations of the above methods and features explicitly or implicitly described herein, according to different embodiments. For example, a computer equipped with network function may be configured as electronic device 900. The device may be a mobile device or a device hosting the first function in the network.

As shown, the device includes a processor 910, such as a central processing unit (CPU) or specialized processors such as a graphics processing unit (GPU) or other such processor unit, memory 920, non-transitory mass storage 930, I/O interface 940, network interface 950, and a transceiver 960, all of which are communicatively coupled via bi-directional bus 970. According to certain embodiments, any or all of the depicted elements may be utilized, or only a subset of the elements. Further, the device 900 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 920 may include any type of non-transitory memory such as static random access memory (SRAM), dynamic random access memory (DRAM), synchronous DRAM (SDRAM), read-only memory (ROM), any combination of such, or the like. The mass storage element 930 may include any type of non-transitory storage device, such as a solid state drive, hard disk drive, a magnetic disk drive, an optical disk drive, USB drive, or any computer program product configured to store data and machine executable program code. According to certain embodiments, the memory 920 or mass storage 930 may have recorded thereon statements and instructions executable by the processor 910 for performing any of the aforementioned method operations described above.

The device 900 further includes a reselection module 905, which may be operatively connected to the other components of the device via the bi-directional serial bus 970. The reselection module 905 may be configured to determine if reselection of a source NF (S-NF) may be required and may further be configured to determine the target NF (T-NF). It would be readily understood based on the above discussion that the NF being reselected by be one or more of a number of network functions which may include AMF, PCF, SMF, NEF, UDM, NWDAF, I-SMF or other network function.

According to an embodiment, there is provided a method for management of network functions. The method includes discovering, by an application function (AF), a set of network exposure functions (NEFs). The method further includes selecting, by the AF, a target network exposure function (T-NEF) communicatively connected with a service area, wherein a user equipment (UE) is in the service area and outside a core service area of a source network exposure function (S-NEF). A technical effect of this embodiment, may be to identify when a network exposure function (NEF) is no longer optimal to support message transfer, thereby improving message transfer.

In some embodiments the method further includes subscribing, by the AF, to an event exposure service with the T-NEF. In some embodiments the method further includes unsubscribing, by the AF, to an event subscription service with the S-NEF. In some embodiments the method further includes requesting, by the AF, to influence traffic routing associated with the UE's traffic via the T-NEF. In some embodiments the method further includes requesting, by the AF, to cancel influence traffic routing associated with the UE's traffic via the S-NEF. In some embodiments the service area of the T-NEF has a core service area different from a core service area of the S-NEF. In some embodiments the service area of the T-NEF further includes an extended service area which at least partially overlaps an extended service area or a core service area of the S-NEF. In some embodiments the UE related information is transferred from the S-NEF to the T-NEF when the UE is within an overlapped service area between the extended service area of the S-NEF and the service area of the T-NEF.

According to another embodiment, there is provided a method for management of network functions. The method includes sending, by a network function (NF) towards a source network exposure function (S-NEF) associated with a user equipment (UE), an event notification. The method further includes, upon selection of a target network exposure function (T-NEF) for association with the UE from a discovered set of network exposure functions (NEFs), sending, by the NF towards the S-NEF, an event subscription update notification indicative of a change of destination for subsequent event notifications. The method further includes receiving, by the NF from the S-NEF, an event subscription update notification acknowledgement indicative of acceptance of the change. The method further includes sending, by the NF towards the T-NEF, the subsequent event notifications. A technical effect of this embodiment, may be to identify when a network exposure function (NEF) is no longer optimal to support message transfer, thereby improving message transfer. A further or alternate technical effect of this embodiment may be to reduce signalling load when a NEF is re-selected to transfer the control messages between NFs of a mobile network and the AF.

In some embodiments the NF is configured as one or more of a session management function (SMF), an access and mobility management function (AMF), a unified data management (UDM), or a policy control function (PCF).

According to another embodiment, there is provided a method for management of network functions. The method includes forwarding, by a source network exposure function (S-NEF) associated with a user equipment (UE), from a network function (NF) towards an application function (AF), an event notification. The method further includes, upon selection of a target network exposure function (T-NEF) for association with the UE from a discovered set of network exposure functions (NEFs), forwarding, by the S-NEF from the NF towards the AF, an event subscription update notification indicative of a change of destination for subsequent event notifications. The method further includes receiving, by the S-NEF from the AF, an event subscription notification acknowledgement indicative of acceptance of the change. The method further includes sending, by the S-NEF towards the T-NEF, an event subscription context transfer request indicative of a request to transfer context information associated with the UE. The method further includes receiving, by the S-NEF from the T-NEF, an event subscription context transfer response indicative of a response to the request. The method further includes sending, by the S-NEF towards the NF, an event subscription update notification acknowledgement indicative of acceptance of the change. A technical effect of this embodiment, may be to identify when a network exposure function (NEF) is no longer optimal to support message transfer, thereby improving message transfer. A further or alternate technical effect of this embodiment may be to reduce signalling load when a NEF is re-selected to transfer the control messages between NFs of a mobile network and the AF.

According to another embodiment, there is provided a method for management of network functions. The method includes receiving, by an application function (AF) from a source network exposure function (S-NEF) associated with a user equipment (UE), an event notification. The method further includes, upon determination of a target network exposure function (T-NEF) for association with the UE, sending, by the AF towards the S-NEF, an event subscription modification request indicative of a change of destination for subsequent event notifications. The method further includes receiving, by the AF from the S-NEF, an event subscription modification response indicative of acceptance of the change. The method further includes receiving, by the AF from the T-NEF, the subsequent event notifications. A technical effect of this embodiment, may be to identify when a network exposure function (NEF) is no longer optimal to support message transfer, thereby improving message transfer. A further or alternate technical effect of this embodiment may be to reduce signalling load when a NEF is re-selected to transfer the control messages between NFs of a mobile network and the AF.

According to another embodiment, there is provided a method for management of network functions. The method includes receiving, by a source network exposure function (S-NEF) associated with a user equipment (UE), from an application function (AF), an event subscription modification request indicative of a change in destination of subsequent event notifications. The method further includes sending, by the S-NEF to a target network exposure (T-NEF) for association with the UE, an event subscription context transfer request indicative of a request to transfer context information associated with the UE. The method further includes receiving, by the S-NEF from the T-NEF, an event subscription transfer response indicative of acceptance of the transfer. The method further includes sending, by the S-NEF to the AF, an event subscription modification response indicative of acceptance of the change. A technical effect of this embodiment, may be to identify when a network exposure function (NEF) is no longer optimal to support message transfer, thereby improving message transfer. A further or alternate technical effect of this embodiment may be to reduce signalling load when a NEF is re-selected to transfer the control messages between NFs of a mobile network and the AF.

In some embodiments the method further includes sending, by the S-NEF to a network function (NF), a request for event subscription modification indicative of the change in destination of subsequent event notifications; and receiving, by the S-NEF from the NF, a response to the request for event subscription modification indicative of acceptance of the change.

According to another embodiment, there is provided a method for management of network functions. The method includes sending, by an intermediate session management function (I-SMF) towards a source network exposure function (S-NEF) associated with a user equipment (UE) via a session management function (SMF), an event notification. The method further includes, upon determination of a target network exposure (T-NEF) for association with the UE, sending, by the I-SMF towards the S-NEF, an event subscription update notification indicative of a change of destination for subsequent event notifications. The method further includes receiving, by the I-SMF from the S-NEF, an event subscription update notification acknowledgement indicative of acceptance of the change. The method further includes sending, by the I-SMF towards the T-NEF, the subsequent event notifications. A technical effect of this embodiment, may be to identify when a network exposure function (NEF) is no longer optimal to support message transfer, thereby improving message transfer. A further or alternate technical effect of this embodiment may be to reduce signalling load when a NEF is re-selected to transfer the control messages between NFs of a mobile network and the AF.

According to another embodiment, there is provided a method for management of network functions. The method includes receiving, by an application function (AF) from a source network exposure function (S-NEF) associated with a user equipment (UE), an event notification. The method further includes, upon determination of a target network exposure function (T-NEF) for association with the UE, sending, by the AF towards the S-NEF, an event subscription modification request indicative of a change in destination of subsequent event notifications. The method further includes receiving, by the AF from the S-NEF, an event subscription modification response indicative of acceptance of the change. The method further includes receiving, by the AF from the T-NEF, the subsequent event notifications. A technical effect of this embodiment, may be to identify when a network exposure function (NEF) is no longer optimal to support message transfer, thereby improving message transfer. A further or alternate technical effect of this embodiment may be to reduce signalling load when a NEF is re-selected to transfer the control messages between NFs of a mobile network and the AF.

According to another embodiment, there is provided a non-transient memory for storing instructions, when executed by a processor, cause the processor to perform a method according to any of embodiment listed above.

According to another embodiment, there is provided an apparatus including a network interface for receiving data from and transmitting data to network nodes connected to a network, a processor, and a non-transient memory for storing instructions that when executed by the processor cause the apparatus to be configured to perform a method according to any of embodiments above.

According to another embodiment, there is provided an apparatus including means for performing a method according to any of embodiments above, and there is provided a communication system comprising apparatuses each of which perform a method according to any of embodiments above. For example, the communication system comprises one or more of apparatuses such as a network function (NF), a target network exposure function (T-NEF) and a source network exposure function (S-NEF) which are communicatively coupled through an interface with each other. The following are examples.

According to another embodiment, there is provided a communication system including at least one processor and a memory storing instructions. Execution of the instructions by the at least one processor implement a network function (NF), a target network exposure function (T-NEF) and a source network exposure function (S-NEF), the NF, the S-NEF and the T-NEF being communicatively coupled through an interface. The network function is configured to send towards the S-NEF associated with a user equipment (UE), an event notification. The network function is further configured to, upon selection of the T-NEF for association with the UE from a discovered set of network exposure functions (NEFs), send towards the S-NEF, an event subscription update notification indicative of a change of destination for subsequent event notifications The network function is further configured to receive from the S-NEF, an event subscription update notification acknowledgement indicative of acceptance of the change. The network function is further configured to send towards the T-NEF, the subsequent event notifications. The S-NEF is configured to receive the event notification. The S-NEF is further configured to receive the event subscription update notification. The S-NEF is further configured to send the event subscription update notification acknowledgement.

According to another embodiment, there is provided a communication system including at least one processor and a memory storing instructions. Execution of the instructions by the at least one processor implement a network function (NF), a target network exposure function (T-NEF) and a source network exposure function (S-NEF), the NF, the S-NEF and the T-NEF being communicatively coupled through an interface. The S-NEF is configured to forward from the NF towards an application function (AF), an event notification. The S-NEF is further configured to, upon selection of the T-NEF for association with a user equipment (UE) from a discovered set of network exposure functions (NEFs), forward from the NF towards the AF, an event subscription update notification indicative of a change of destination for subsequent event notifications. The S-NEF is further configured to receive from the AF, an event subscription notification acknowledgement indicative of acceptance of the change. The S-NEF is further configured to send towards the T-NEF, an event subscription context transfer request indicative of a request to transfer context information associated with the UE. The NF is configured to receive the event notification. The NF is further configured to receive the event subscription update notification.

According to another embodiment, there is provided a communication system including at least one processor and a memory storing instructions. Execution of the instructions by the at least one processor implement an application function (AF), a target network exposure function (T-NEF) and a source network exposure function (S-NEF), the AF, the S-NEF and the T-NEF being communicatively coupled through an interface. The AF is configured to receive from the S-NEF associated with a user equipment (UE), an event notification. The AF is further configured to, upon determination of the T-NEF for association with the UE, send towards the S-NEF, an event subscription modification request indicative of a change of destination for subsequent event notifications. The AF is further configured to receive from the S-NEF, an event subscription modification response indicative of acceptance of the change. The AF is further configured to receive from the T-NEF, the subsequent event notifications. The S-NEF is configured to send the event notification. The S-NEF is further configured to receive the event subscription modification request. The S-NEF is further configured to send the event subscription modification response.

According to another embodiment, there is provided a communication system including at least one processor and a memory storing instructions. Execution of the instructions by the at least one processor implement an application function (AF), a target network exposure function (T-NEF) and a source network exposure function (S-NEF), the AF, the S-NEF and the T-NEF being communicatively coupled through an interface. The S-NEF is configured to receive from the AF, an event subscription modification request indicative of a change in destination of subsequent event notifications. The S-NEF is further configured to send to the T-NEF for association with a user equipment (UE), an event subscription context transfer request indicative of a request to transfer context information associated with the UE. The S-NEF is further configured to receive from the T-NEF, an event subscription transfer response indicative of acceptance of the transfer. The S-NEF is further configured to send to the AF, an event subscription modification response indicative of acceptance of the change. The AF is configured to send the event subscription modification request. The AF is further configured to receive the event subscription modification response.

According to another embodiment, there is provided a communication system including at least one processor and a memory storing instructions. Execution of the instructions by the at least one processor implement an intermediate session management function (I-SMF), a target network exposure function (T-NEF) and a source network exposure function (S-NEF), the I-SMF, the S-NEF and the T-NEF being communicatively coupled through an interface. The I-SMF is configured to send towards the S-NEF associated with a user equipment (UE) via a session management function (SMF), an event notification. The I-SMF is further configured to, upon determination of the T-NEF for association with the UE, send towards the S-NEF, an event subscription update notification indicative of a change of destination for subsequent event notifications. The I-SMF is further configured to receive from the S-NEF, an event subscription update notification acknowledgement indicative of acceptance of the change. The I-SMF is further configured to send towards the T-NEF, the subsequent event notifications. The S-NEF is configured to receive the event notification. The S-NEF is further configured to receive the event subscription update notification. The S-NEF is further configured to send the event subscription update notification acknowledgement indicative of acceptance of the change.

According to another embodiment, there is provided a communication system including at least one processor and a memory storing instructions. Execution of the instructions by the at least one processor implement an application function (AF), a target network exposure function (T-NEF) and a source network exposure function (S-NEF), the AF, the S-NEF and the T-NEF being communicatively coupled through an interface. The AF is configured to receive from the S-NEF associated with a user equipment (UE), an event notification. The AF is further configured to, upon determination of the T-NEF associated with the UE, send towards the S-NEF, an event subscription modification request indicative of a change in destination of subsequent event notifications. The AF is further configured to receive from the S-NEF, an event subscription modification response indicative of acceptance of the change. The AF is further configured to receive from the T-NEF, the subsequent event notifications. The S-NEF is configured to send the event notification. The S-NEF is further configured to receive the event subscription modification request. The S-NEF is further configured to send the event subscription modification response indicative of acceptance of the change.

According to another embodiment, there is provided a communication system including at least one processor and a memory storing instructions. Execution of the instructions by the at least one processor implement an application function (AF), a target network exposure function (T-NEF) and a source network exposure function (S-NEF), the AF, the S-NEF and the T-NEF being communicatively coupled through an interface. The AF is configured to discover a set of network exposure functions (NEFs). The AF is further configured to select the T-NEF communicatively connected with a service area, wherein a user equipment (UE) is in the service area and outside a core service area of the S-NEF.

It will be appreciated that, although specific embodiments of the technology have been described herein for purposes of illustration, various modifications may be made without departing from the scope of the technology. The specification and drawings are, accordingly, to be regarded simply as an illustration of the invention as described by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

As used herein, the term "about" should be read as including variation from the nominal value, for example, a +/−10% variation from the nominal value. It is to be understood that such a variation is always included in a given value provided herein, whether or not it is specifically referred to.

The person having ordinary skill in the art will appreciate that terms such as "notify" and "notification" in the context of signals being sent are to be taken to mean notification. In certain cases, to conform with naming conventions of service operations, these terms have been used interchangeably in this detailed description and the appended figures.

Embodiments of the present invention may be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

Acts associated with the method described herein may be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which may be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations may be made thereto without departing from the invention. The specification and drawings are, accordingly, to be regarded simply as an illustration of the invention as described by the appended claims, and are contemplated to cover any and all modifications, variations, combinations or equivalents that fall within the scope of the present invention.

What is claimed is:

1. An apparatus comprising a processor and a non-transient memory for storing instructions that when executed by the processor cause the apparatus to be configured to perform a method including steps of:
sending, towards a source network exposure function (S-NEF) associated with a user equipment (UE), an event notification;
obtaining, information on a target network exposure function (T-NEF) to be associated with the UE, and sending towards the S-NEF an event subscription update notification indicative of a change of destination for subsequent event notifications;
receiving, from the S-NEF, an event subscription update notification acknowledgement indicative of acceptance of the change; and
sending, towards the T-NEF, the subsequent event notifications.

2. The apparatus of claim 1, wherein the obtaining step comprising performing a selection of the T-NEF for the UE from a set of network exposure functions (NEFs).

3. The apparatus of claim 2, wherein the method further comprises: discovering the set of NEFs.

4. The apparatus of claim 1, wherein the event subscription update notification includes information on the T-NEF.

5. The apparatus of claim 1 wherein the apparatus is configured to perform as one or more of a session management function (SMF), an access and mobility management function (AMF), a unified data management (UDM), or a policy control function (PCF).

6. An apparatus comprising a processor and a non-transient memory for storing instructions that when executed by the processor cause the apparatus to be configured to perform a method including steps of:

receiving an event notification from a network function (NF) and sending the event notification to an application function (AF);

obtaining information on a target network exposure function (T-NEF) to be associated with a user equipment (UE);

sending, towards the T-NEF, an event subscription context transfer request indicative of a request to transfer context information associated with the UE;

receiving, from the T-NEF, an event subscription context transfer response indicative of a response to the request; and sending, towards the NF, an event subscription update notification acknowledgement indicative of acceptance of the request.

7. The apparatus of claim 6 wherein the method further comprising:

receiving, from the NF, an event subscription update notification indicative of a change of destination for subsequent event notifications and sending it to the AF.

8. The apparatus of claim 7, wherein the event subscription update notification includes information of the T-NEF.

9. The apparatus of claim 7 wherein the method further comprising:

receiving, from the AF, an event subscription notification acknowledgement indicative of acceptance of the change.

10. The apparatus of claim 6 wherein the information on the T-NEF is obtained from one of the NF and the AF.

11. The apparatus of claim 6 wherein the apparatus is configured to perform as a source network exposure function (S-NEF) associated with the UE.

12. A communication system comprising a network function (NF), a first network exposure function (NEF) and a second NEF, wherein:

the NF is configured to:

send an event notification to the first NEF which is configured to perform as a source NEF (S-NEF) associated with a user equipment (UE);

obtain information on the second NEF which is configured to perform as a target NEF (T-NEF) associated with the UE, and send, to the first NEF, an event subscription update notification indicative of a change of destination for subsequent event notifications;

receive, from the first NEF, an event subscription update notification acknowledgement indicative of acceptance of the change; and send, towards the second NEF, the subsequent event notifications; and wherein the first NEF, when performing as the S-NEF associated with the UE, is configured to:

receive the event notification from a network function (NF) and send it to an application function (AF);

obtaining the information on the second NEF;

send, to the second NEF, an event subscription context transfer request indicative of a request to transfer context information associated with the UE;

receive, from the second NEF, an event subscription context transfer response indicative of a response to the request; and send, to the NF, an event subscription update notification acknowledgement indicative of acceptance of the request.

13. The communication system of claim 12 wherein the second NEF, when performing as the T-NEF associated with the UE, is configured to:

receive the event subscription context transfer request from the first NEF; and send the event subscription context transfer response to the first NEF.

14. The communication system of claim 12 wherein the second NEF is further configured to perform as a new S-NEF associated with the UE by receiving the subsequent event notifications from the NF and sending them to the AF.

15. The communication system of claim 12 wherein the NF is further configured to perform a selection of the second NEF for the UE from a discovered set of network exposure functions (NEFs) and send the information on the second NEF to one or more of the first NEF and the AF.

16. The communication system of claim 12 further comprising the AF configured to perform a selection of the second NEF for the UE from a discovered set of network exposure functions (NEFs) and send the information on the second NEF to one or more of the first NEF and the NF.

17. The communication system of claim 12 further comprising the AF configured to receive the event notification from the first NEF and the subsequent event notifications from the second NEF.

18. The communication system of claim 12 wherein the first NEF is further configured to send the event subscription update notification to the AF and receive the event subscription notification acknowledgement from the AF.

19. The communication system of claim 12 wherein the AF is further configured to subscribe to an event exposure service with the second NEF and unsubscribe to an event subscription service with the first NEF.

20. The communication system of claim 12 wherein the AF is further configured to request to influence traffic routing associated with the UE's traffic via the second NEF and request to cancel influence traffic routing associated with the UE's traffic via the S-NEF.

* * * * *